(12) United States Patent
Gao et al.

(10) Patent No.: US 9,173,147 B2
(45) Date of Patent: Oct. 27, 2015

(54) COMMUNICATING DATA USING A LOCAL WIRELESS ACCESS NETWORK NODE

(71) Applicant: RESEARCH IN MOTION LIMITED, Waterloo (CA)

(72) Inventors: Shiwei Gao, Nepean (CA); Yufei Wu Blankenship, Kildeer, IL (US); Zhijun Cai, Euless, TX (US); Yi Song, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 98 days.

(21) Appl. No.: 13/745,051

(22) Filed: Jan. 18, 2013

(65) Prior Publication Data

US 2014/0204771 A1  Jul. 24, 2014

(51) Int. Cl.
 *H04W 36/28* (2009.01)
 *H04W 36/30* (2009.01)
 *H04W 84/04* (2009.01)

(52) U.S. Cl.
 CPC .............. *H04W 36/28* (2013.01); *H04W 36/30* (2013.01); *H04W 84/045* (2013.01)

(58) Field of Classification Search
 None
 See application file for complete search history.

(56) References Cited

U.S. PATENT DOCUMENTS

| 2008/0069020 | A1 | 3/2008 | Richardson | |
|---|---|---|---|---|
| 2008/0207170 | A1* | 8/2008 | Khetawat et al. | 455/411 |
| 2008/0267146 | A1 | 10/2008 | Lewis | |
| 2009/0040982 | A1 | 2/2009 | Ho | |
| 2009/0052350 | A1* | 2/2009 | Chen et al. | 370/255 |
| 2009/0232019 | A1 | 9/2009 | Gupta | |
| 2010/0182950 | A1 | 7/2010 | Sexton | |
| 2010/0296487 | A1* | 11/2010 | Karaoguz et al. | 370/332 |
| 2010/0296497 | A1* | 11/2010 | Karaoguz et al. | 370/338 |
| 2010/0296498 | A1* | 11/2010 | Karaoguz et al. | 370/338 |
| 2010/0296499 | A1* | 11/2010 | Karaoguz et al. | 370/338 |
| 2012/0002564 | A1 | 1/2012 | Sexton | |
| 2012/0122424 | A1* | 5/2012 | Herscovici et al. | 455/411 |
| 2012/0214445 | A1 | 8/2012 | Stojanovski | |
| 2012/0252524 | A1* | 10/2012 | Gora et al. | 455/522 |
| 2012/0322450 | A1* | 12/2012 | Karaoguz et al. | 455/436 |
| 2013/0225193 | A1* | 8/2013 | Lee et al. | 455/452.2 |
| 2014/0177840 | A1* | 6/2014 | Liu | 380/270 |

OTHER PUBLICATIONS

3GPP TS 33.401 V8.4.0, Technical Specification, 3rd Generation Partnership Project; Technical Specification Group Services and System Aspects; 3GPP System Architecture Evolution (SAE): Security architecture; (Release 8), Jun. 2009 (95 pages).

3GPP TR 33.821 V8.0.0, Technical Report, 3rd Generation Partnership Project; Technical Specification Group Services and System Aspects; Rationale and track of security decisions in Long Term Evolved (LTE) RAN/3GPP System Architecture Evolution (SAE) (Release 8), Mar. 2009 (137 pages).

(Continued)

*Primary Examiner* — Donald Mills

(74) *Attorney, Agent, or Firm* — Trop Pruner & Hu, P.C.

(57) ABSTRACT

A local wireless access network node receives a request to offload at least a portion of data traffic for a user equipment from a macro wireless access network node to the local wireless access network node, where the user equipment is to maintain a wireless connection to the macro wireless access network node after the offload. The local wireless access network node sends a response to indicate whether the local wireless access node has accepted or denied the request.

29 Claims, 23 Drawing Sheets

(56) References Cited

OTHER PUBLICATIONS

3GPP TS 36.300 V10.3.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Mar. 2011 (197 pages).
3GPP TS 36.331 V11.0.0, Technical Specification, 3rd Generation Partnership Project; Technical Specification Group Radio Access Network; Evolved Universal Terrestrial Radio Access (E-UTRA); Radio Resource Control (RRC); Protocol specification (Release 11), Jun. 2012 (302 pages).
3GPP TS 36.413 V11.1.0, Technical Specification, 3rd Generation Partnership Project; Technical Specification Group Radio Access Network; Evolved Universal Terrestrial Radio Access Network (E-UTRAN); S1 Application Protocol (S1AP) (Release 11), Sep. 2012 (262 pages).
3GPP TS 36.423 V11.2.0, Technical Specification, 3rd Generation Partnership Project; Technical Specification Group Radio Access Network; Evolved Universal Terrestrial Radio Access Network (E-UTRAN); X2 application protocol (X2AP) (Release 11), Sep. 2012 (136 pages).
3GPP TR 36.806 V9.0.0, Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010 (34 pages).
3GPP TR 36.839 V11.1.0, Technical Report, 3rd Generation Partnership Project; Technical Specification Group Radio Access Network; Evolved Universal Terrestrial Radio Access (E-UTRA); Mobility enhancements in heterogeneous networks (Release 11), Dec. 2012 (53 pages).
3GPP TR 36.912 V11.0.0, Technical Report, 3rd Generation Partnership Project; Technical Specification Group Radio Access Network; Feasibility study for Further Advancements for E-UTRA (LTE-Advanced) (Release 11), Sep. 2012 (62 pages).
Han et al., Capacity Analysis of Generalized Distributed Wireless Communication System and Transmit Antenna Selection for Maximization of Average Capacity, IEEE 2004 (5 pages).
Shan-Yuan Hol, Data Fusion in a Relay Network, SIT 2008, Toronto, Canada, Jul. 6-11, 2008 (5 pages).
Vasken Genc et al., IEEE 802.16J Relay-Based Wireless Access Networks: An Overview, Oct. 2008 (8 pages).
Kerpez et al., IEEE Transactions on Vehicular Technology, vol. 45, No. 2, 265—A Radio Access System with Distributed Antennas, May 1996 (11 pages).
David Soldani et al., Radio Communications Series, Nokia Siemens Networks, Wireless Relays for Broadband Access, Mar. 2008 (9 pages).
[Draft] 3GPP TR 36.392 V0.1.0 Technical Report 3rd Generation Partnership Project; Technical Specification Group Radio Access Network; Scenarios and Requirements for Small Cell Enhancement for E-UTRA and E-UTRAN; (Release 12) (Oct. 2012) (12 pages).
U.S. Patent Office—International Searching Authority, International Search Report and Written Opinion for PCT/US2014/010469 dated Jun. 24, 2014 (11 pages).

\* cited by examiner

COMMUNICATING DATA USING A LOCAL WIRELESS ACCESS NETWORK NODE

BACKGROUND

As the number of wireless user equipments has increased, wireless access service providers are increasingly facing challenges in meeting capacity demands in regions where the density of users is relatively high. To address capacity issues, small cells have been developed. A small cell (or multiple small cells) can operate within a coverage area of a larger cell, referred to as a macro cell. A small cell has a coverage area that is smaller than the coverage area of the macro cell.

If small cells are deployed, then communications with user equipments (UEs) can be offloaded from the macro cell to the small cells. In this way, data communication capacity is increased to better meet data communication demands in regions of relatively high densities of UEs.

BRIEF DESCRIPTION OF THE DRAWINGS

Some embodiments are described with respect to the following figures.

DETAILED DESCRIPTION

Local Wireless Access Network Nodes in Coverage Area of a Macro Cell

Figure 1:
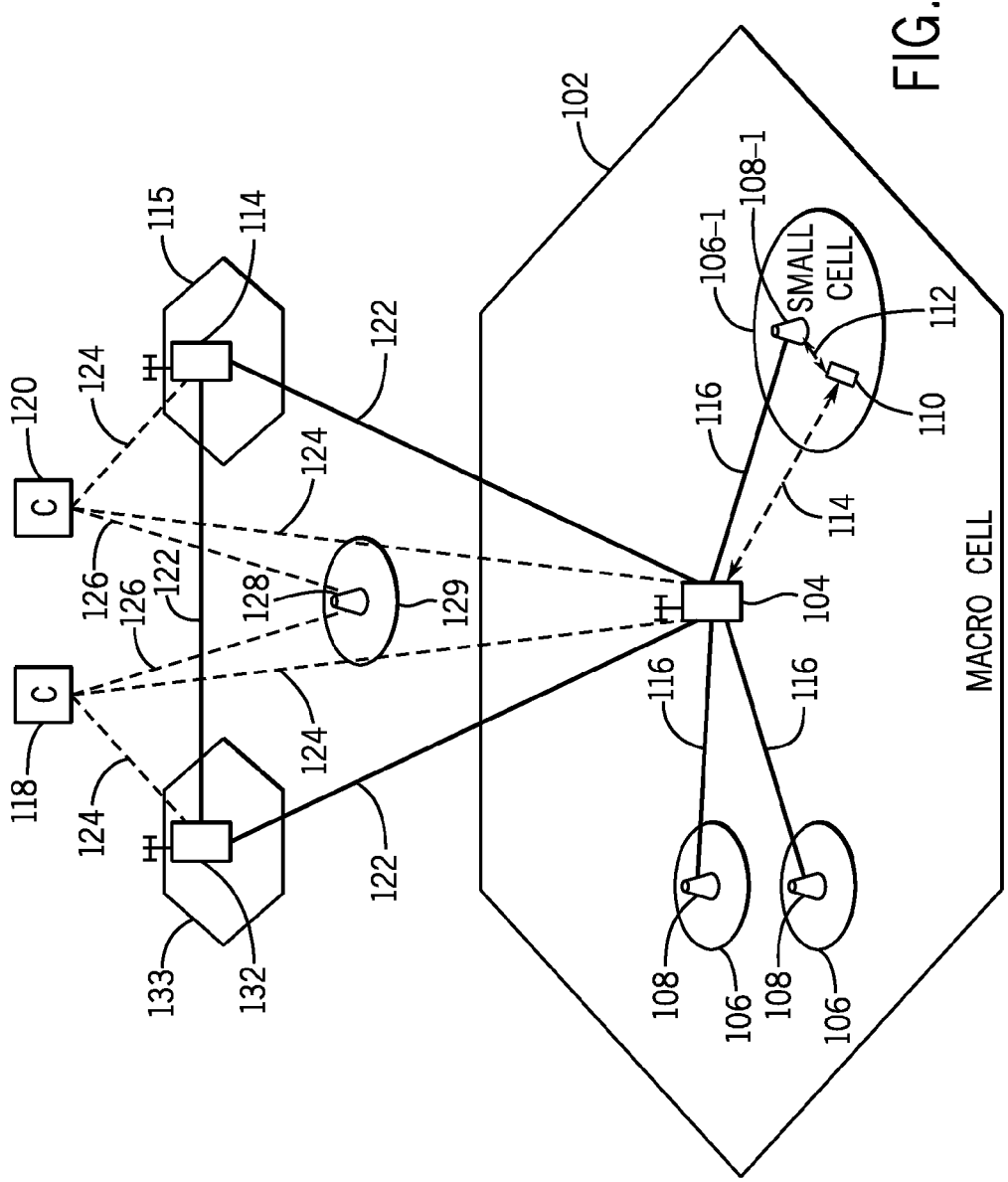
FIG. 1 is a schematic diagram of an example arrangement that includes macro cells and small cells, in accordance with some implementations.

FIG. 1 illustrates an example arrangement that includes a number of network nodes that are part of a mobile communications network that supports wireless communications with user equipments (UEs). A node can refer to an active electronic device that is capable of sending, receiving, and forwarding information over a communication channel, and of performing designated tasks. A macro cell 102 corresponds to a coverage area provided by a macro wireless access network node 104. A coverage area can refer to a region where mobile services can be provided by a network node to a target level. A wireless access network node is responsible for performing wireless transmissions and receptions with UEs. In addition, a number of small cells 106 are depicted as being within the coverage area of the macro cell 102. Each small cell 106 corresponds to a coverage area provided by a respective local wireless access network node 108. One of the small cells 106 is labeled as 106-1, and the respective local wireless access node is labeled 108-1.

FIG. 1 also shows a backhaul link 116 between the macro wireless access network node 104 and each of the local wireless access network nodes 108. The backhaul link 116 can represent a logical communication link between two nodes; the backhaul link 116 can either be a direct point-to-point link or can be routed through another communication network or node. In some implementations, the backhaul link 116 is a wired link. In other implementations, the backhaul link 116 is a wireless link.

In the ensuing discussion, a small cell can refer to a cell whose coverage area is smaller than the coverage area provided by a larger cell, which is also referred to as a macro cell. Wireless communication in a small cell is supported by a local wireless access network node. In some examples, the frequency at which the macro wireless access network node 104 operates is lower than that of the local wireless access network node. A lower frequency allows a greater geographic reach for wireless signals transmitted by the macro wireless access network node 104. A higher frequency, on the other hand, of wireless signals transmitted by the local wireless access nodes 108 prevents such wireless signals from propagating great distances. As a result, small cells 106 can be deployed in relatively close proximity to each other.

More generally, the macro cell 102 uses a frequency that is different from one or more frequencies of the small cells 106. At least some of the small cells 106 can use different frequencies.

A wireless user equipment (UE) 110 within the coverage area of the small cell 106-1 is able to wirelessly communicate with the local wireless access network node 108-1. The UE 110 is also able to wirelessly communicate with the macro wireless access network node 104. Examples of the UE 110 can include any of the following: a smartphone, a personal digital assistant, a notebook computer, a tablet computer, or any other device that is capable of wireless communications. Although just one UE 110 is depicted in FIG. 1, it is noted that multiple UEs may be present in coverage areas of each of the small cells 106 as well as within the coverage area of the macro cell 102.

A first wireless connection 112 is established between the UE 110 and the local wireless access network node 108-1. In addition, a second wireless connection 114 can be established between the UE 110 and the macro wireless access network node 104. The first wireless connection 112 can be used to communicate a first type of data, while the second wireless connection 114 can be used to communicate a second type of data. In some implementations, the first type of data communicated over the first wireless connection 112 between the UE 110 and the local wireless access network node 108-1 includes user plane data, while the second type of data communicated over the second wireless connection 114 between the UE 110 and the macro wireless access network node 104 includes control plane data. In this manner, the UE 110 has a dual connection with the macro wireless access network node and with the local wireless access network node.

Generally, control plane data includes control messages to perform various control tasks, such as any or some combination of the following: network attachment of a UE, authentication of the UE, setting up radio bearers for the UE, mobility management to manage mobility of the UE (mobility management includes at least determining which infrastructure network nodes will create, maintain or drop uplink and downlink connections carrying control or user plane information as a UE moves about in a geographic area), performance of a handover decision based on neighbor cell measurements sent by the UE, transmission of a paging message to the UE, broadcasting of system information, control of UE measurement reporting, and so forth. Although examples of control tasks and control messages in a control plane are listed above, it is noted that in other examples, other types of control messages and control tasks can be provided. More generally, the control plane can perform call control and connection control functions, and can provide messaging for setting up calls or connections, supervising calls or connections, and releasing calls or connections.

User plane data includes the bearer data (e.g. voice, user data, application data, etc.) to be communicated between the UE and a wireless access network node. User plane data can provide for transfer of bearer data, and can also include control data and/or signals between a wireless access network node and a UE associated with the communication of the bearer data, for performing flow control, error recovery, and so forth.

By communicating control plane data between the macro wireless access network node 104 and the UE 110 (rather than between the local wireless access network node 108-1 and the UE 110), the design of the local wireless access network node 108-1 can be simplified. The local wireless access network node 108-1 only has to communicate user plane data with the UE 110, without having to handle and communicate control plane data with the UE 110 (in some implementations). The macro wireless access network node 104 is connected to the UE 110 for control plane traffic and optionally for user plane traffic. Simplifying the design of the local wireless access network nodes 108 results in less complex and more cost-effective local wireless access network nodes for deploying small cells. In addition, simplified local wireless access network nodes can reduce the complexity and signaling overhead in a core network of the mobile communications network. In the example of FIG. 1, the core network can include control nodes 118 and 120. Additional details regarding various core network nodes are provided further below.

Although at least some of the local wireless access network nodes 108 may have simplified designs in which the local wireless access network nodes 108 do not have to handle and communicate control plane data with the UE 110, it is noted that in other implementations, one or more local area network nodes may have greater functionality, such as being able to handle and communicate control plane data.

In some configurations, most user plane data in the macro cell 102 can be communicated with UEs through the local wireless access network nodes 108. However, it is possible for some user plane data to be communicated with UEs over wireless connections between the macro wireless access network node 104 and UEs.

Generally, for the UE 110, the macro wireless access network node 104 provides wireless coverage (by communicating control plane data), while the bulk of the data throughput is provided by the local wireless access network node 108-1. In addition, the macro wireless access network node 104 can include a gateway function for the local wireless access network nodes 108 that are within the coverage area of the macro cell 102. In its role as a gateway, the macro wireless access network node 104 can configure the operations of the local wireless access network nodes 108 in the macro cell 102. For example, the gateway can synchronize the local wireless access network nodes 108 by sending a synchronization signal. Mobility-related radio resource control relating to a UE between small cells 106 in the macro cell 102 can be managed by the gateway. Other coordination tasks can also be managed by the gateway.

In some implementations, a control plane data stream (including control messages) and a user plane data stream (including data packets) for a UE can be received at a network component, such as a macro wireless access network node. An inter-cell scheduler can decide, based on a measurement report (containing radio link measurement data) from the UE, that a subset of the data plane data stream is to be sent to the UE via a local wireless access node, where the local wireless access node is connected to the network component via a backhaul link. The network component sends the subset of the data plane data stream to the local wireless access network node. The local wireless access network node sends the subset of the data plane data stream over a first wireless connection to the UE, where the first wireless connection is established between the local wireless access network node and the UE. The network component communicates the control plane data stream over a second wireless connection to the user equipment, where the second wireless connection exists simultaneously with the first wireless connection.

FIG. 1 also shows additional macro wireless access network nodes 132 and 114 that support respective macro cells 133 and 115. The macro wireless access network nodes 104, 132, and 114 can be coupled to each other over respective links 122. A link 122 between two macro wireless access network nodes can be different from a link 116 between a macro wireless access network node and a local wireless access network node. FIG. 1 further depicts control links 124 between the control nodes 118, 120 (part of a core network) and the corresponding macro wireless access network nodes 104, 132, and 114.

In some examples, there can be at least one small cell that is outside the coverage area of a macro cell (or of any macro cell). One such small cell is small cell 129, which is supported by a local wireless access network node 128. Control links 126 can be provided between the control nodes 118, 120 and the local wireless access network node 128.

In the ensuing discussion, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards. Some LTE standards which relate to cellular communications are: 3GPP TS 36.300, "Evolved Universal Terrestrial Radio Access (E-UTRA) and Evolved Universal Terrestrial Radio Access Network (E-UTRAN); Overall description: Stage 2 (Release 10)", V10.3.0 (2011 March); 3GPP TS 36.806: "Relay architectures for E-UTRA (LTE-Advanced)"; 3GPP TS 36.413: "Evolved Universal Terrestrial Radio Access Network (E-UTRAN); S1 Application Protocol (S1AP) (Release 11)", v11.0.0, 2012-7; and 3GPP TR 36.912 V 11.0.0 (2012 September) "Feasibility study for Further Advancements for E-UTRA (LTE-Advanced); 3GPP TS 36.423: "Evolution Universal terrestrial Radio Access (E-UTRA): X2 application protocol (X2AP) (Release 11)", v11.2.0, 2012 September; 3GPP TS 36.331: "Evolution Universal terrestrial Radio Access (E-UTRA):Radio Resource Control (RRC), Protocol specification (Release 11)", v11.0.0, 2012 July; 3GPP TR 36.839: "Evolution Universal terrestrial Radio Access (E-UTRA): mobility enhancements in heterogeneous networks (Release 11)", v11.0.0, 2012 September." For the most part, the signal acronyms and layer names described in this application are adapted from these LTE standards. Although reference is made to LTE in the ensuing discussion, it is noted that techniques or mechanisms according to some implementations can be applied to other wireless access technologies.

In an LTE network, a wireless access network node can be implemented as an enhanced Node B (eNB), which includes functionalities of a base station and base station controller. Thus, in an LTE network, the macro wireless access network nodes 102, 132, and 114 are referred to as macro eNBs. In an LTE network, the local wireless access network nodes 108 can be referred to as local eNBs (LeNBs). The links 122 between macro eNBs 104, 132, and 114 are implemented as X2 interfaces according to the LTE standards (see, for example, 3GPP TS 36.423 cited above). The backhaul links 116 between a macro eNB and an LeNB can be implemented as an X3 interface. An X3 interface is not between two peer eNBs, but rather between a macro eNB and a subordinate eNB (e.g. LeNB). The X3 interface makes the LeNB appear to be a cell of the associated macro eNB to a core network. Accordingly, the core network interacts with a macro eNB, and not with individual LeNBs. Note that the X3 interface can also be referred to as an X2e interface.

In an LTE network, the control nodes 118 and 120 can be implemented as mobility management entities (MMEs) that are part of the LTE core network (which also includes additional core network nodes discussed further below). An MME is a control node for performing various control tasks associated with an LTE network. For example, the MME can perform idle mode UE tracking and paging, bearer activation and deactivation, selection of a serving gateway (discussed further below) when the UE initially attaches to the LTE network, handover of the UE between macro eNBs, authentication of a user, generation and allocation of a temporary identity to a UE, and so forth. In other examples, the MME can perform other or alternative tasks.

The control links 124 and 126 between the MMEs 118, 120 and the eNBs 104, 132, 114, and 128 can be implemented as S1 interfaces according to the LTE standards.

Figure 2:
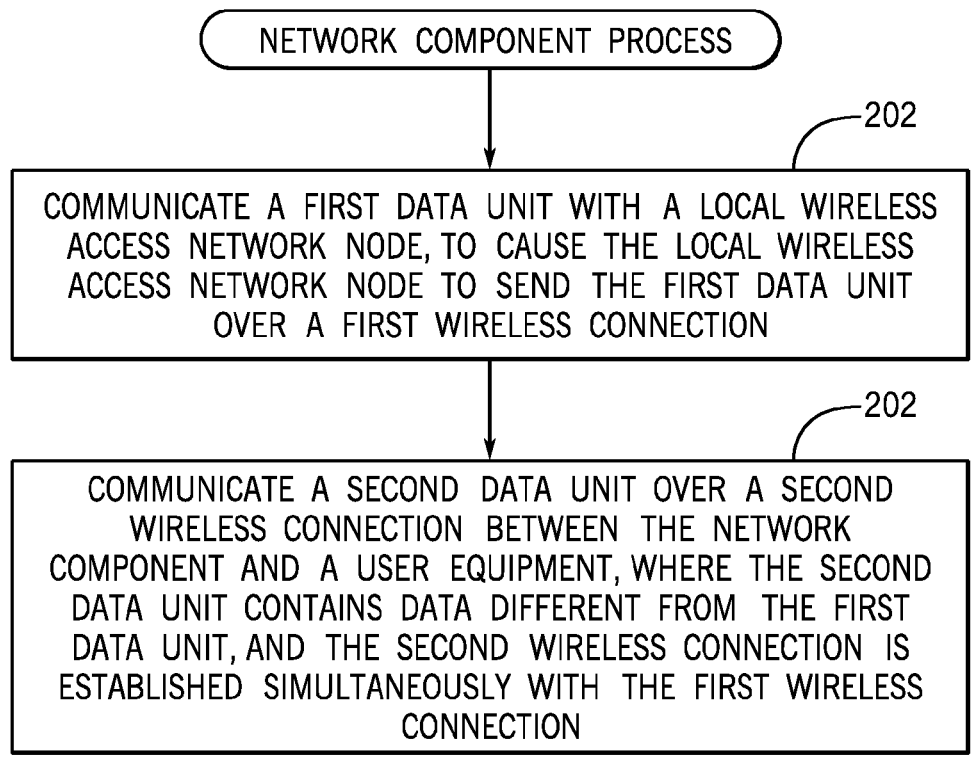
FIG. 2 is a flow diagram of a network component process according to some implementations.

FIG. 2 is a flow diagram of a process according to some implementations. The process of FIG. 2 can be performed by a network component, such as the macro eNB 104 (or more generally, a macro wireless access network node). The network component communicates (at 202) a first data unit with an LeNB (or more generally a local wireless access network node), to cause the LeNB to send the first data unit over a first wireless connection (e.g. 112 in FIG. 1) between the LeNB and the UE (e.g. 110 in FIG. 1). A data unit can refer to any collection of data.

The network component further communicates (at 204) a second data unit over a second wireless connection (e.g. 114 in FIG. 1) between the network component and the UE. The second data unit contains data that is different from data in the first data unit; in other words, the data contained in the second data unit is not a duplicate of the data contained in the first data unit. In some examples, the first data unit can include user plane data, while the second data unit can include control plane data.

The second wireless connection is established simultaneously with the first wireless connection. Simultaneous wireless connections can refer to either simultaneous logical connections or simultaneous physical connections. Note that data does not have to be actively being communicated at the same time over the simultaneous wireless connections. Rather, "simultaneous" wireless connections can refer to wireless connections that are concurrently set up, but which are capable of communicating data, either concurrently or at different times.

In examples where the UE has multiple physical protocol stacks, the UE can establish multiple simultaneous physical wireless connections between the UE and corresponding wireless access network nodes (including an LeNB and a macro eNB). A protocol stack includes layers that provide specified procedures for performing communications. However, in other implementations, the UE may include just one physical protocol stack. In such implementations, the UE would be capable of establishing just one physical wireless connection; however, the UE can establish multiple simultaneous logical wireless connections with the corresponding wireless access network nodes (including an LeNB and a macro eNB). The simultaneous logical wireless connections are set up at the same time, and can be provided over the one physical wireless connection. The one physical wireless connection can be time-multiplexed between the LeNB and macro eNB. In a first time interval, the UE can have a physical wireless connection with the LeNB, in which case data can be communicated over the logical wireless connection between the UE and the LeNB. In a second time interval, the UE can have a physical wireless connection with the macro eNB, in which case data can be communicated over the logical wireless connection between the UE and the macro eNB.

Figure 3:
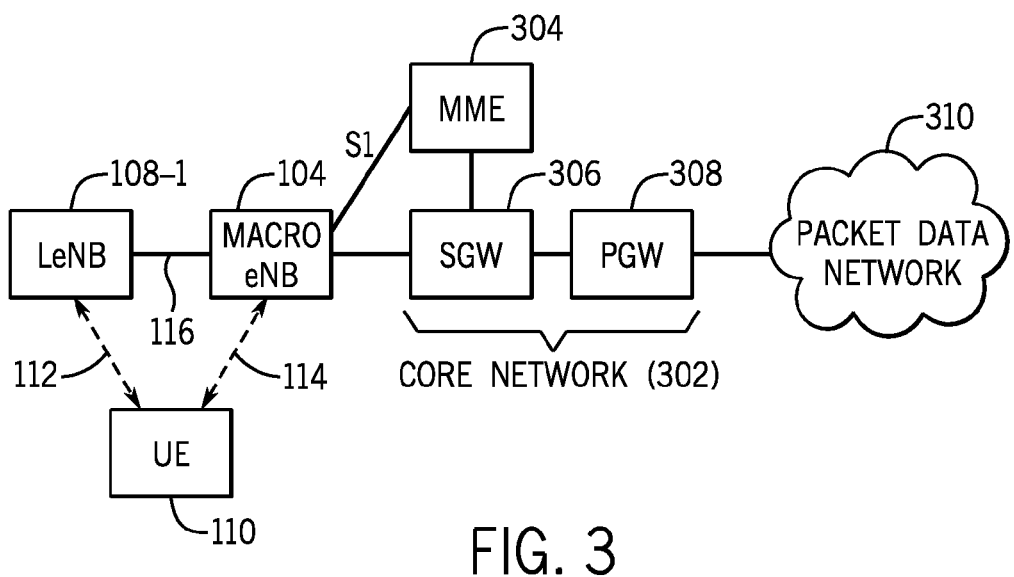
FIG. 3 is a schematic diagram of another example arrangement that includes various nodes of a mobile communications network, according to some implementations.

FIG. 3 depicts additional components of an LTE network that includes the macro eNB 104 and the LeNB 108-1 as discussed above. The LTE network shown in FIG. 3 further includes a core network 302. The core network 302 has various core network nodes, including an MME 304, a serving gateway (SGW) 306, and a packet gateway (PGW) 308. Although just one MME 304, SGW 306, and PGW 308 are depicted in FIG. 3, note that an LTE network can include multiple MMEs, SGWs, and PGWs.

As noted above, the MME 304 is a control node for performing various control tasks associated with an LTE network. The SGW 306 routes and forwards bearer data packets of a UE served by the SGW 306, and can also act as a mobility anchor for the user plane during handover procedures. The PGW 308 provides connectivity between the UE (served by the PGW 308) and an external packet data network 310 (e.g. Internet, local area network, etc.). The PGW 308 is the entry and egress point for data communicated between a UE in the LTE network and a network element coupled to the packet data network 310.

The following assumes that the small cell provided by the LeNB 108-1 is within the coverage area of the macro cell provided by the macro eNB 104. The small cell is within the coverage of a macro cell if a signal from the macro eNB 104 can reach the LeNB 108-1 over the corresponding backhaul link 116 (which can be a wired or wireless link).

As noted above, user plane data can be communicated over the first wireless connection 112 between the LeNB 108-1 and the UE 110 (and in some cases may be communicated over the wireless connection 114 between the macro eNB 104 and the UE 110). However, control plane data is communicated over the second wireless connection 114 between the macro eNB 104 and the UE 110 (but is not communicated between the LeNB 108-1 and the UE 110 over the wireless connection 112). As a result, the control plane protocol can be the same as if the UE 110 is connected to the macro eNB 104 only (rather than also connected to the LeNB 108-1).

An S1 interface is provided between the macro eNB 104 and the MME 304. However, note that the S1 interface does not extend between the MME 304 and the LeNB 108-1, since the LeNB 108-1 does not communicate control plane data to the UE 110. Maintaining the control plane within the macro eNB 104 has the benefit that the MME 304 only has to keep track of which macro cell the UE is associated with, rather than the small cell. This makes mobility handling procedures at the MME 304 simpler, where the mobility handling procedures can include handover, paging, and tracking area update.

For user plane data, a tunnel can be established from the SGW/PGW (that supports the UE 110) to the macro eNB 104. This tunnel can be a GPRS (General Packet Radio Service) Tunneling Protocol (GTP) tunnel, in some examples. Other types of tunnels can be established in other examples. There can be one GTP tunnel per UE bearer. Note that the GTP tunnel does not extend to the LeNB 108-1. In some examples, a UE bearer can refer to an Enhanced Packet Services (EPS) bearer, which can be established between the UE 110 and an Enhanced Packet Core (EPC) that includes the SGW 306 and the PGW 308.

User plane data can include uplink data (sent from the UE 110 towards the core network 302) and downlink data (sent from the core network 302 to the UE 110). A downlink data packet targeted to the UE 110 is mapped to a UE bearer at the PGW 308 serving the UE 110, and the downlink data packet is sent through the corresponding GTP tunnel to the macro eNB 104.

When the macro eNB 104 receives a downlink data packet, the macro eNB 104 associates the downlink data packet in the GTP tunnel to the corresponding LeNB 108-1. The macro eNB then sends the downlink data packet to the LeNB 108-1, which in turn forwards the downlink data packet to the UE 110. The macro eNB 104 sends the downlink data packet over the backhaul link 116 between the macro eNB 104 and the LeNB 108-1. The LeNB 108-1 then transmits the downlink data packet over the wireless connection 112 between the LeNB 108-1 and the UE 110.

An uplink data packet is transmitted in the reverse direction from the UE 110 to the LeNB 108-1, and then from the LeNB 108-1 to the macro eNB 104. The macro eNB 104 then sends the uplink data packet through the respective GTP tunnel for the UE bearer associated with the UE 110 to the core network 302.

Note that the UE 110 can also communicate user plane data through the macro eNB 104 (in addition to communicating user plane data through the LeNB 108-1). In some examples, the UE 110 does not establish a user plane connection with the macro eNB 104 and LeNB 108-1 simultaneously.

Figure 4:
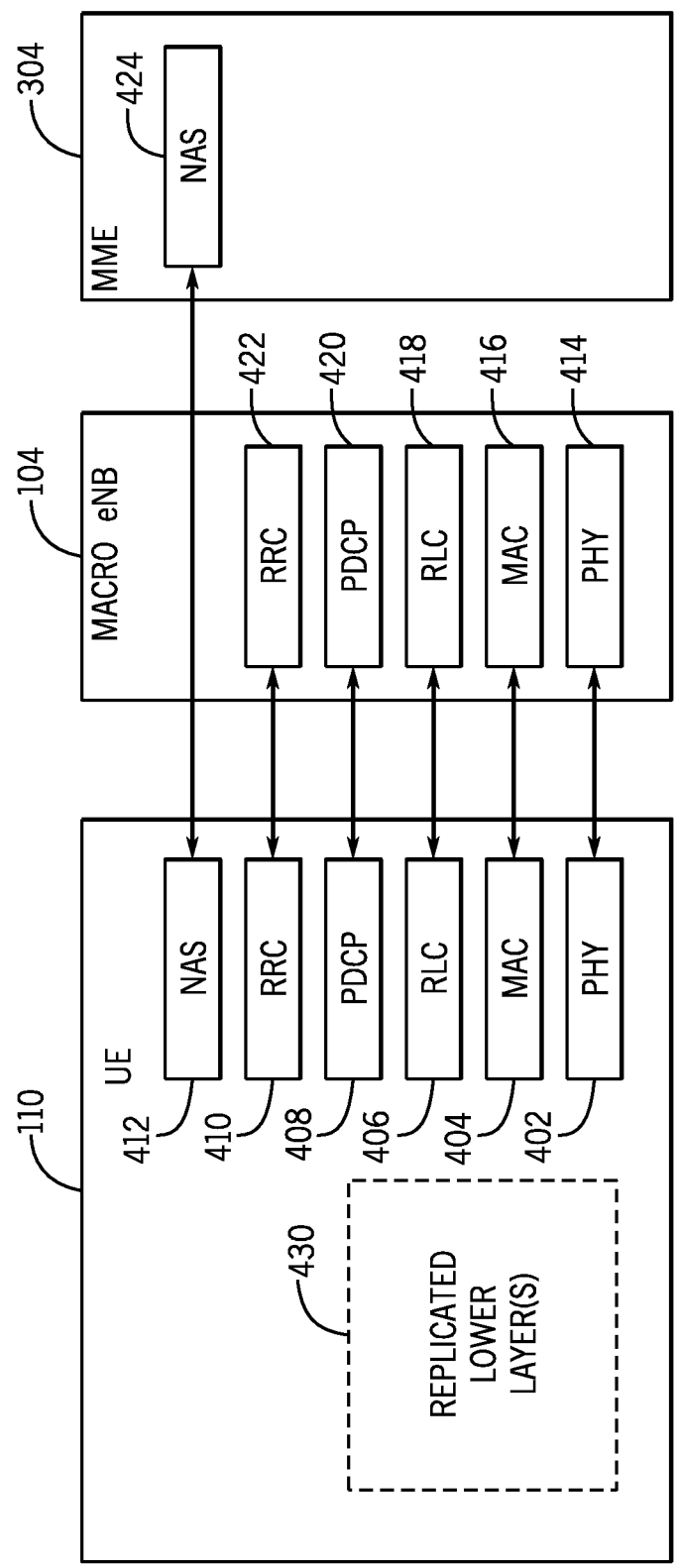
FIG. 4 is a block diagram of protocol layers associated with a control plane, in accordance with some implementations.

FIG. 4 shows control plane protocol stacks in various nodes for communicating control plane data. The protocol stack in the UE 110 includes a physical (PHY) layer 402, a medium access control (MAC) layer 404, a radio link control (RLC) layer 406, a Packet Data Convergence Protocol (PDCP) layer 408, a radio resource control (RRC) layer 410, and a non-access stratum (NAS) layer 412. Control plane data of the upper layers (including the RRC layer 410 and the NAS layer 412) can be passed through the lower layers, including the PDCP layer 408, RLC layer 406, MAC layer 404, and physical layer 402, for transmission to the macro eNB 104. In some examples, control plane data that is sent over the wireless connection between the UE 110 and the macro eNB 104 includes NAS and RLC messages.

In some implementations, to support dual connection of the UE 110 with both the macro eNB 104 and the LeNB 108-1, at least some of the lower layers (including 408, 406, 404, and 402) can be replicated as replicated lower layer(s) in the UE 110, where the replicated layer(s) are represented as dashed box 430. The replicated lower layer(s) 430 can be used to establish a wireless connection with the LeNB 108-1 for communication of user plane data with the LeNB 108-1. The replicated lower layer(s) 430 for user plane data communication is (are) discussed further below.

Note that in other examples, replication of protocol stack layers does not have to be performed. For example, just one set of the lower layers (408, 406, 404, 402) can be provided in the UE 110, such that the UE 110 can establish just a single physical wireless connection (which is connected to the macro eNB 104 and LeNB 108-1 at different times). However, in such implications, the UE 110 is capable of establishing multiple simultaneous logical wireless connections (provided over the physical wireless connection) to allow for communication of data with the LeNB and macro eNB 104.

The protocol stack in the macro eNB 104 includes a physical layer 414, a MAC layer 416, an RLC layer 418, a PDCP layer 420, and an RRC layer 422. In addition, the MME 304 includes a NAS layer 424 to interact with the NAS layer 412 in the UE 110.

The physical layer 402 or 414 is the lowest layer in the corresponding node (UE 110 or macro eNB 104). The physical layer 402 or 414 can include networking hardware for transmitting signals over a wireless link. The MAC layer 404 or 416 provides addressing and channel access control mechanisms.

The RLC layer 406 or 418 can provide at least some of the following example functionalities, as described in 3GPP TS 36.322:
- transfer of upper layer packet data units (PDUs);
- error correction, such as by using Automatic Repeat reQuest (ARQ);
- concatenation, segmentation, and reassembly of RLC service data units (SDUs);
- reordering of RLC data PDUs;
- duplicate data detection;
- discarding of an RLC SDU;
- RLC re-establishment; and
- protocol error detection.

The PDCP layer 408 or 420 can provide at least some of the following functionalities in the user plane, as described in 3GPP TS 36.323:
- header compression and decompression;
- transfer of user data;
- in-sequence delivery of upper layer PDUs;
- duplicate detection of lower layer SDUs;
- retransmission of PDCP SDUs;
- ciphering and deciphering; and
- timer-based SDU discard in the uplink.

Example functionalities supported by the PDCP layer 408 or 420 for the control plane can include:
- ciphering and integrity protection; and
- transfer of control plane data.

The RRC layer 410 or 422 can be used to perform at least some of the following example functionalities, as described in 3GPP TS 36.331:
- control of handover decisions based on neighbor cell measurements sent by the UE;
- transmission of a page to a UE;
- broadcast of system information;
- control of UE measurement reporting; and
- allocation of a temporary identity to a UE.

The NAS layer 412 or 424 can provide at least some of the following example functionalities, as described in 3GPP TS 23.060:
- network attachment of a UE;
- authentication of a UE;
- setting up bearers; and
- mobility management.

Although various example functionalities are provided above for the various layers of FIG. 4, it is noted that in other examples, additional or alternative functionalities can be provided by respective layers.

In some scenarios, an LeNB is able to cause the macro eNB 104 to send an RLC message to the UE 110. For example, if the LeNB becomes aware that a configuration, such as a radio link configuration associated with the UE 110, is to change, then the LeNB can send update information to the macro eNB 104. This causes the macro eNB 104 to send the respective RRC message to the UE 110 to perform the configuration change for the radio link between the LeNB and the UE 110. Compared to an RRC message that is sent directly from an eNB to the UE 110, the relay of RRC-related information from the LeNB to the macro eNB 104 and then to the UE 110 is associated with some amount of delay (latency).

From the perspective of the UE 110, the UE 110 maintains a single RRC connection to the macro eNB 104 as long as the UE 110 is within the coverage area of the macro cell provided by the macro eNB 104. Consequently, no hard handover is performed from a macro cell to a small cell, or between small cells. This can allow for avoidance of handover failures that may occur if hard handovers are performed between a macro cell and a small cell or between small cells. A hard handover involves breaking a wireless connection between a source cell and a UE before establishing a new wireless connection between a target cell and the UE.

However, as noted above, the macro eNB 104 can act as a gateway for managing soft handovers of a UE between different cells.

Figure 5:
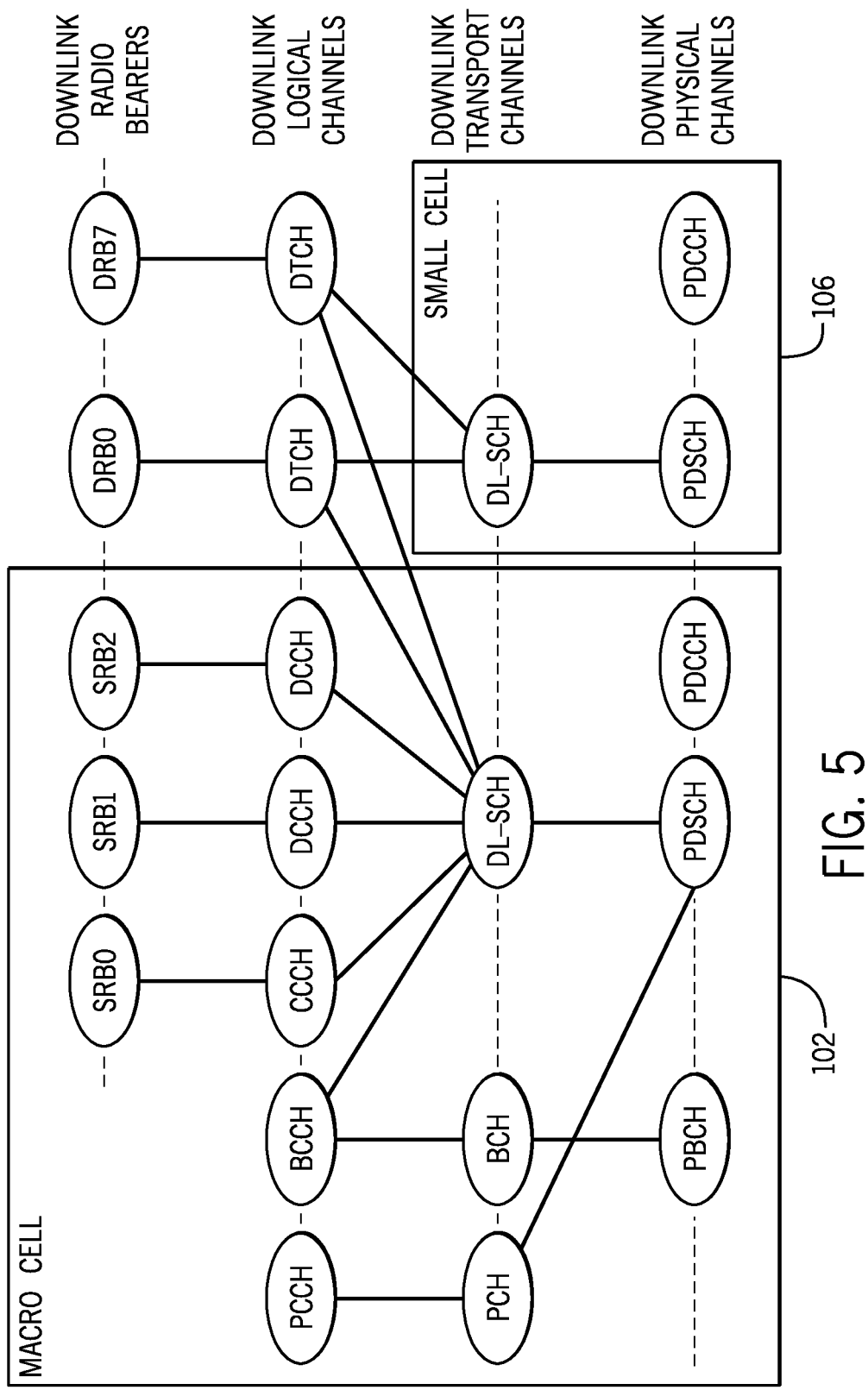
FIGS. 5 and 6 illustrate mappings between downlink and uplink bearers, respectively, and various channels in a macro cell and small cell, in accordance with some implementations.
Figure 6:
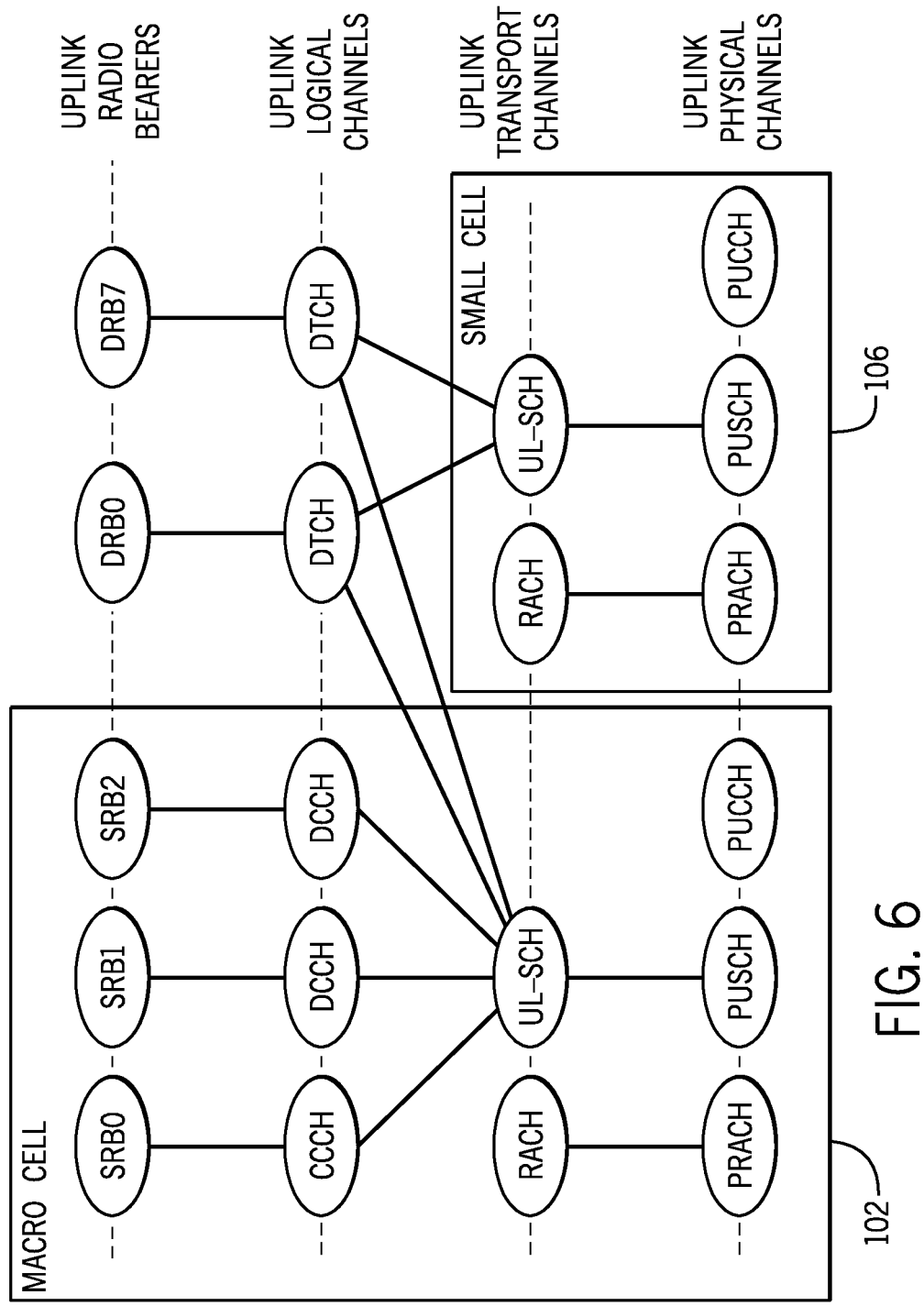

When a UE is connected to a small cell for user plane data communication, and connected to a macro cell for control plane messaging, then the mappings of signaling radio bearers (SRBs) and data radio bearers (DRBs) to respective logical, transport, and physical channels in the downlink and uplink are depicted in FIGS. 5 and 6, respectively. According to LTE, a signaling radio bearer (SRB) is a radio bearer (RB) that is used only for the transmission of RRC and NAS messages. Three SRBs can be provided, including SRB0, SRB1, and SRB2. As described in the LTE standards, SRB0, SRB1, and SRB2 are used to carry different control plane data (RRC messages or NAS messages) under different scenarios.

A data radio bearer (DRB) transports bearer data between a UE and an eNB. SRBs and DRBs according to LTE are described further in 3GPP TS 36.323.

For downlink communications, as shown in FIG. 5, SRB0, SRB1, and SRB2 can be transmitted in various downlink logical channels, downlink transport channels, and downlink physical channels in the macro cell 102. SRB0 is mapped to a common control channel (CCCH), while SRB1 and SRB2 are mapped to respective dedicated control channels (DCCHs).

Downlink user plane data is carried in various DRBs, including DRB0 to DRB7, for example. The DRBs are mapped to respective dedicated traffic channels (DTCHs).

The CCCH, DCCHs, and DTCHs are downlink logical channels. The downlink logical channels in FIG. 5 also include a paging control channel (PCCH) and a broadcast control channel (BCCH).

The various downlink logical channels of FIG. 5 are mapped to respective downlink transport channels. The DTCHs are mapped to a downlink shared channel (DL-SCH) in the small cell 106. Note that in some examples, the DTCHs can also be mapped to a DL-SCH of the macro cell 102 (for cases where downlink user plane data can be sent through the macro cell 102 in addition to or instead of being sent through the small cell 106).

The CCCH and DCCHs that carry the SRBs are mapped to a DL-SCH in the macro cell 102. The BCCH is mapped to a broadcast channel (BCH) and the DL-SCH. The PCCH is mapped to the PCH in the macro cell 102.

The various downlink transport channels of FIG. 5 are further mapped to downlink physical channels. The DL-SCH in the small cell 106 is mapped to a physical downlink shared channel (PDSCH) in the small cell 106. The PCH and DL-SCH in the macro cell 102 are mapped to a PDSCH in the macro cell 102. The BCH in the macro cell 102 is mapped to a physical broadcast channel (PBCH) in the macro cell 102.

The mapping between the various radio bearers, logical channels, transport channels, and physical channels describe how the respective radio bearers are carried in the corresponding channels. For example, a DRB is carried in a DTCH, which in turn is carried in a DL-SCH of the small cell 106, which is carried in the PDSCH of the small cell 106. Similarly, an SRB in the macro cell 102 is carried in a CCCH or DCCH of the macro cell 102, which in turn is carried in the DL-SCH of the macro cell 102, which further is carried in the PDSCH of the macro cell 102. On the downlink, SRBs can utilize PCH and BCH, and DL-SCH and the BCCH are sent over the macro cell PDSCH.

To support the PDSCH in the macro cell 102, a physical downlink control channel (PDCCH) is provided in the macro cell 102, where the PDCCH carries control information for supporting communication in the PDSCH. Similarly, to support the PDSCH in the small cell 106, a PDCCH is also provided in the small cell 106. Although not shown, an E-PDCCH (enhanced PDCCH) can also be supported in the macro cell 102 and the small cell 106.

FIG. 6 shows the mapping of the uplink radio bearers (including SRB0-SRB2 and DRB0-DRB7) to various uplink logical channels, uplink transport channels, and uplink physical channels. In the macro cell 102, an uplink SRB0 is mapped to the CCCH in the macro cell 102, and an uplink SRB1 and uplink SRB2 are mapped to respective DCCHs in the macro cell 102. The CCCH and DCCH in the macro cell 102 are mapped to an uplink shared channel (UL-SCH) in the macro cell 102, which in turn is mapped to a physical uplink shared channel (PUSCH) in the macro cell 102. In the macro cell 102, a random access channel (RACH) is mapped to a physical random access channel (PRACH). A physical uplink control channel (PUCCH) is also defined in the macro cell 102 to support uplink transmission over the PUSCH.

The data bearers DRBs are mapped to respective DTCHs, which in turn are mapped to an UL-SCH in the small cell 106. The UL-SCH is mapped to a PUSCH in the small cell 106. In addition, the small cell 106 is also provided with an RACH that is mapped to a PRACH. In addition, a PUCCH in the small cell 106 supports uplink communications over the PUSCH in the small cell 106.

The PRACH in the macro cell 102 or small cell 106 can be used to initiate synchronization with the respective macro eNB 104 or LeNB 108-1. The PUCCH is used to carry various control information associated with uplink transmissions in the PUSCH in the macro cell 102 or small cell 106.

On the uplink, SRBs are carried over the PUSCH of the macro cell 102, while DRBs are carried over the PUSCH of both the macro cell 102 and the small cell 106. To support uplink transmission, PRACH and PUCCH are defined in both the macro cell 102 and the small cell 106. PRACH, for example, is used to obtain separate time alignment with the macro eNB 104 and the LeNB 108, because the LeNB schedules DL-SCH independently from the macro eNB. Note also that a dual-connected UE has to synchronize with both the macro cell 102 and the small cell 106, which can be accomplished by obtaining the separate time alignment referenced above. Also, PUCCH is also provided in the small cell 106 to carry channel feedback information and hybrid automatic repeat request (HARQ) acknowledge/negative acknowledge (ACK/NACK) associated with the LeNB.

In both FIGS. 5 and 6, note that the DRBs and DTCHs are not depicted as being part of either the small cell 106 or the macro cell 102. The location of the DRBs and the DCHs depends upon where a split occurs in the user plane protocol stack between the macro eNB and the LeNB, as discussed further below. Depending on where the protocol stack above the MAC layer is split between the macro eNB and the LeNB, a DRB and the associated DTCH conceivably may reside in either the macro cell or the small cell.

Splitting of User Plane Protocol Stack

The user plane can include various protocol layers, including a PDCP layer, RLC layer, MAC layer, and physical layer. At least some of these protocol layers can be included in the LeNB. Which protocol layers are included in the LeNB depends on where a user plane protocol stack is split in the macro eNB. Splitting a user plane protocol stack at a given point results in multiple user plane paths, with one user plane path through the macro eNB and another user plane path through the LeNB. The splitting can be performed at one of several different points in the user plane protocol stack, as discussed in connection with split designs 1-4 below. Distribution of data along the different user plane paths can involve data distribution at the radio bearer (RB) level. Thus, for example, data of some DRBs can be communicated over the user plane path through the LeNB, while data of other DRBs can be communicated over the user plane path through the macro eNB. Communicating data of some DRBs over a user plane path that extends through an LeNB can be referred to as offloading the data of such DRBs from the macro eNB to the LeNB.

In terms of security, the PDCP layer provides ciphering and integrity protection for the control plane, and ciphering for the user plane. If the small cell 106 is in the coverage area of the macro cell 102, the PDCP layer is operated as if the small cell is part of the macro cell, so that the security keys (ciphering and integrity protection) for both control plane and user plane are generated and updated with reference to the macro eNB.

RLC service data units (SDUs) are fragmented and/or concatenated as appropriate to fit into available transmission resources. This process is closely coordinated by the MAC layer that indicates to each RLC entity how much data the RLC entity is allowed to send as each transmission opportunity arises. Due to the close coupling between the RLC and MAC layers, it may be useful to keep the RLC and MAC layers in the same eNB, in some examples.

For data offload via a small cell, logical control channels associated with RLC transparent mode, such as BCCH, PCCH, and CCCH, are transmitted directly from the macro eNB. Thus the small cell does not have to handle transparent mode packets in this case. For legacy UEs, or those UEs incapable of dual connections, a small cell eNB may act as a normal eNB, and in that case, all those control channels would be supported by the small cell.

Split Design 1

While data traffic can be divided into two parallel paths (one to the macro cell, the other to the small cell) directly by the SGW, this may cause the signaling traffic through the core network to increase, especially as the number of small cells increase.

One option to support data offload to small cells may be to split the user plane data before the PDCP layer in the macro eNB; in this arrangement, a separate PDCP/RLC/MAC stack is deployed in the small cell while a single RRC can still be used at the macro eNB to perform functions such as mobility, paging, broadcasting, small cell activation/deactivation, security, and provision of UE measurement reports.

Figure 7:
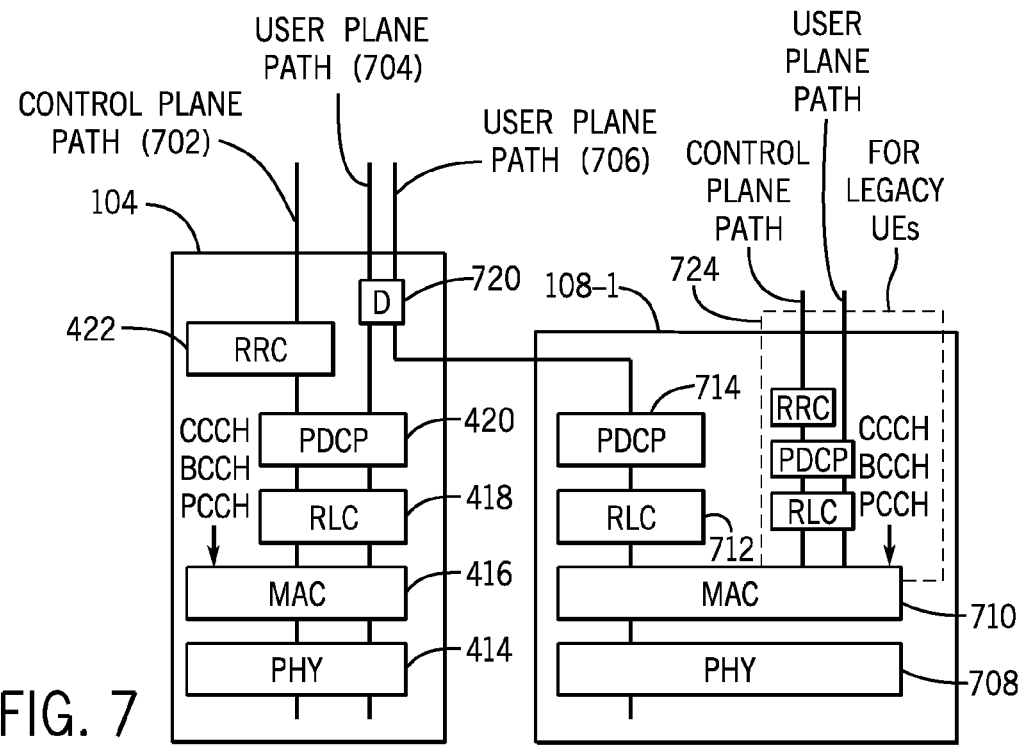
FIGS. 7-14 illustrate various different user plane split designs according to various implementations.

In split design 1, the user plane protocol stack can be split right above the PDCP layer 420 in the macro eNB 104, as shown in FIG. 7. The split occurs at a splitting point between the PDCP layer 420 and a layer right above the PDCP layer 420 in the macro eNB 104. The user plane data is routed to the macro cell and then split before the PDCP layer 420. In this design, all or a subset of data radio bearers (DRBs) can be assigned to the small cell. A radio bearer (RB) level scheduler, in the form of data distribution logic 720, may be used at the macro cell to determine if an RB is to be handled by the macro cell or small cell. Because data splitting occurs above the MAC layer, the MAC layer can support backhaul links with various latencies between the macro cell and small cell. With split design 1, only user plane data is handled by the LeNB 108-1 while control plane data and data routing is handled by the macro eNB 104. Data offload occurs at the DRB level, i.e. the LeNB 108-1 carries different DRBs from the macro eNB 104. With split design 1, the UE 110 is configured to have two separate MAC layers, one that communicates with the macro eNB 104 and the other that communicates with the LeNB 108-1. Dynamic data scheduling is done independently in each cell since a separate MAC layer is used in the small cell.

The protocol layers 414, 416, 418, 420, and 422 in the macro eNB 104 are the same as corresponding layers depicted in FIG. 4. FIG. 7 shows a signaling path 702, which extends through the RRC layer 422 and the lower layers 420, 418, 416, and 414.

Two user plane paths 704 and 706 (created due to the split above the PDCP layer 420) are also depicted in FIG. 7. The user plane path 704 extends through the PDCP layer 420, RLC layer 418, MAC layer 416, and physical layer 414 in the macro eNB 104. On the other hand, the user plane path 706 extends from the macro eNB 104 through the following protocol layers in the LeNB 108-1: PDCP layer 714, RLC layer 712, MAC layer 710, and physical layer 708. By splitting the user plane protocol stack above the PDCP layer 420 in the macro eNB 104, all of the PDCP, RLC, MAC, and physical layers are replicated at the LeNB 108-1. In some examples, an RRC layer can also be included in the LeNB 108-1 to perform certain RRC functions for radio resource configuration. However, note that the control plane functions are still handled by the macro eNB 104.

Deploying a protocol stack that includes all of the PDCP, RLC, MAC, and physical layers can increase the complexity of the LeNB 108-1. However, splitting the user plane protocol stack above the PDCP layer 420 involves minimal change in the protocol stack deployed in the LeNB 108-1.

Moreover, deploying both the RLC layer and MAC layer in the LeNB 108-1 also allows easier coordination between the RLC and MAC layers. Note that an RLC SDU can be fragmented or concatenated as appropriate to fit into available transmission resources in the MAC layer. This process can be coordinated by the MAC layer, which can indicate to the RLC layer how much data the RLC layer is allowed to send as each transmission opportunity arises. Not splitting the RLC and MAC layers between the macro eNB and LeNB makes such coordination simpler.

In addition, tighter interaction between hybrid automatic repeat request (HARQ) logic in the MAC layer and the RLC layer can be provided. The HARQ logic in the MAC layer can indicate failed transmissions to the RLC layer, to cause the RLC logic to perform retransmission without waiting for a negative acknowledgment (NACK) from the receiving RLC logic (in the receiving device).

On the other hand, compared to splitting below the RLC layer, providing the RLC layer in the LeNB 108-1 may not allow RLC context transfer, since the RLC layer may be reset during handover between small cells. During handover, any remaining (un-transmitted) RLC PDUs may be flushed when the protocol stack is re-established at the target cell. A central node (such as the macro eNB 104) may not be able to include a retransmission buffer for holding RLC PDUs for retransmission following handover to the target cell.

In split design 1, all or a subset of DRBs can be assigned to the LeNB 108-1. In some implementations, the data distribution logic 720 steers DRBs between the two user plane paths 704 and 706. The data distribution logic 720 can be provided in the macro eNB 104 to determine, at bearer setup, if a given DRB is to be communicated to the UE by the macro cell or small cell. In split design 1, the data distribution logic 720 can be implemented in logic above the PDCP layer 420 to decide whether the given DRB is to be passed to the PDCP layer 420 (in the macro eNB 104) or to the PDCP layer 714 (in the LeNB 108-1).

Because data splitting occurs above the MAC layer 416 in the macro eNB 104, the backhaul link (116 in FIG. 1) between the macro eNB 104 and the LeNB 108-1 can tolerate larger latencies, since coordination between different layers of the user plane protocol stack split across the macro eNB 104 and the LeNB 108-1 does not have to be performed. An independent MAC layer (710) at LeNB 108-1 for dynamic data scheduling of the user plane data through the small cell is part of some embodiments.

FIG. 7 also shows protocol layers (within dashed box 724) that are used for legacy UEs or other UEs that are not capable of dual connections. The presence of the protocol layers (724) allows the LeNB 108-1 to appear as a normal eNB for the foregoing UEs.

Split Design 2

Figure 8:
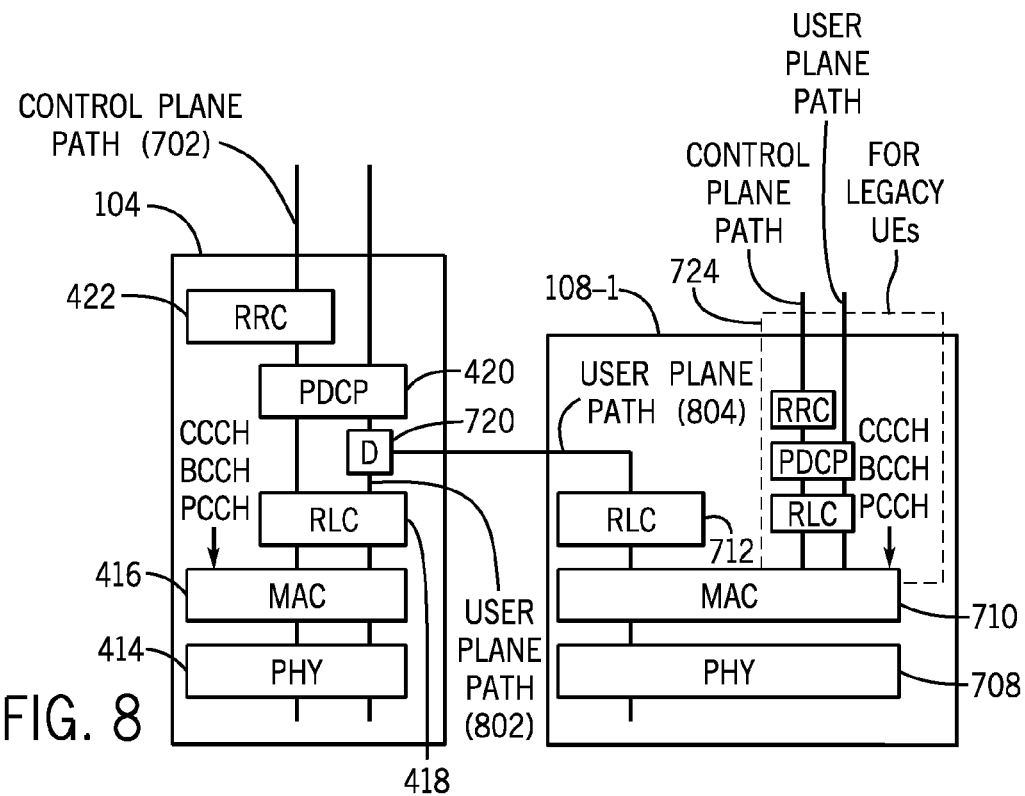

In split design 2, the user plane protocol stack can be split right below the PDCP layer 420, as shown in FIG. 8. The split occurs at a splitting point between the PDCP layer 420 and the RLC layer 418 in the macro eNB 104. In this split design, a single PDCP layer 420 is maintained in the macro eNB 104, with no PDCP layer provided in the LeNB 108-1. Data going to the small cell is split after the PDCP layer 420.

The data distribution logic 720 (which provides inter-cell data scheduling) can be provided in the macro eNB 104 to determine if a RB is to be handled by the macro eNB 104 or the LeNB 108-1. In some examples, the inter-cell data scheduling provided by the data distribution logic 720 can specify that all SRBs are handled by the macro eNB 104 and all DRBs are handled by the LeNB 108-1.

Split design 2 preserves the tighter interaction between the MAC and RLC layers. The MAC layer can indicate failed transmissions to the RLC layer. The RLC transmitting entity can retransmit without waiting for a NACK in a status report from the receiving RLC entity. The RLC PDU size can be provided to the RLC layer internally by the MAC layer.

On the other hand, split design 2 may not allow for RLC context transfer, such as for RLC reset in case of data offload to a different small cell. Any remaining RLC PDUs are flushed when the protocol stack is re-established at the target small cell. To prevent packet loss, the PDCP layer 420 in the macro eNB 104 may have to implement a retransmission buffer to hold packets until the packets are successfully delivered by the RLC layer 712 in the LeNB 108-1. The PDCP layer 420 can enable packets to be retransmitted to the UE (if in RLC Acknowledge Mode) following a handover to the target small cell. This may involve an indication from the RLC layer. In addition to the signaling overhead, a larger retransmission buffer in the PDCP layer may have to be provided to support higher backhaul latencies.

FIG. 8 depicts a user plane path 802 and a user plane path 804 split below the PDCP layer 420. The user plane path 802 extends from the PDCP layer 420 through the RLC layer 418, MAC layer 416, and physical layer 414 of the macro eNB 104. The user plane path 804 extends from the PDCP layer 420 in the macro eNB 104 through the RLC layer, MAC layer 710, and physical layer 708 in the LeNB 108-1.

As with split design 1, various benefits or issues associated with providing the RLC and MAC layers in the LeNB 108-1 may also be present with split design 2.

FIG. 8 also shows the data distribution logic 720 in the macro eNB 104 that can include the data distribution logic for steering of DRBs between the macro eNB 104 and the LeNB 108-1. For example, one DRB may be steered by the data distribution logic 720 along user plane path 802, such that the DRB is communicated by the macro eNB 104 to the UE. Another DRB may be steered by the data distribution logic 720 to the user plane path 804, in which case this other DRB is routed through the LeNB 108-1 for transmission to the UE.

In split design 2, the data distribution logic 720 can be part of the PDCP 420 in the macro eNB 104, for example.

Figure 9:
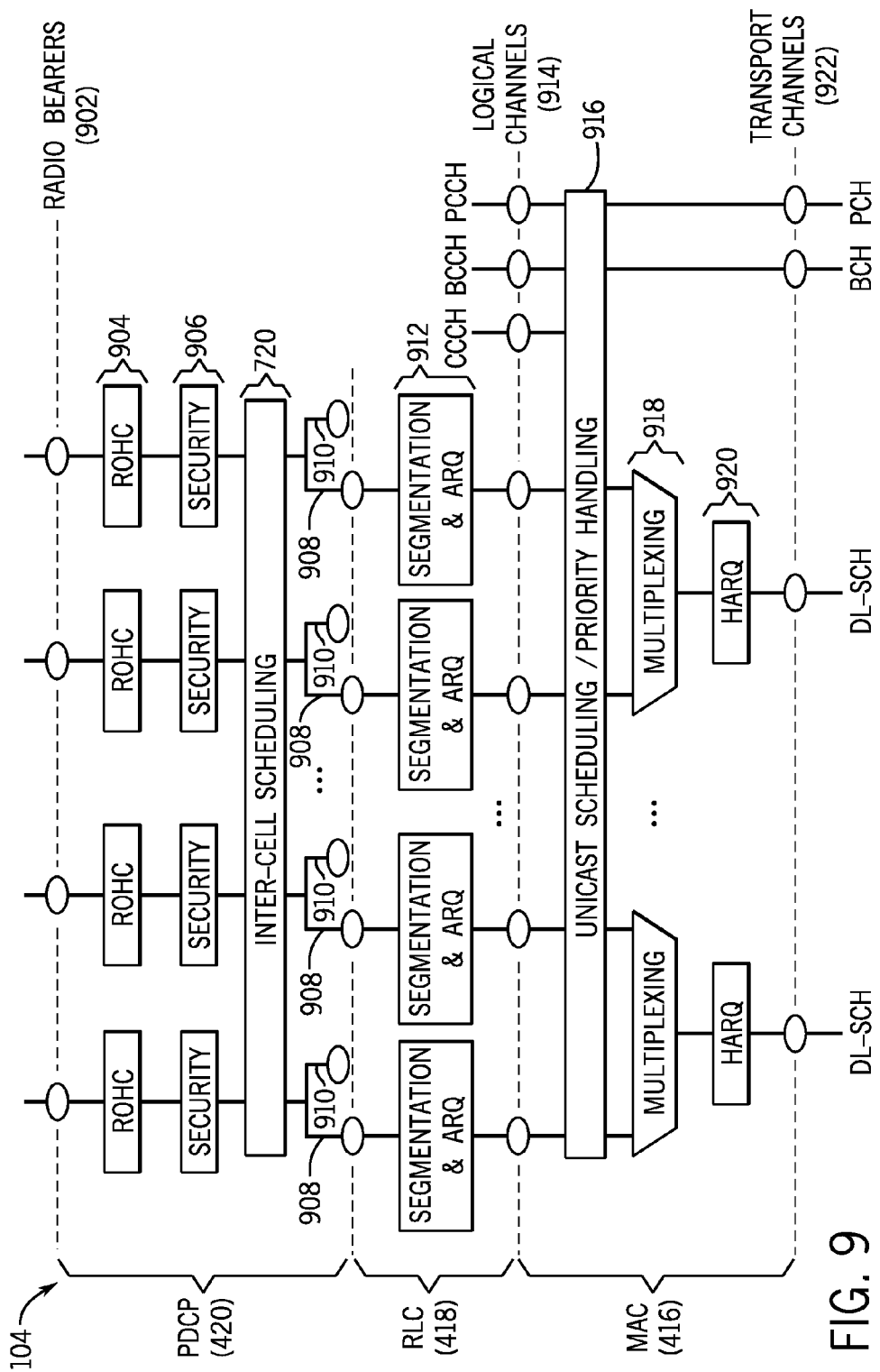

Further details of the protocol layers in the macro eNB 104 for split design 2 are shown in FIG. 9. Radio bearers 902 (represented by respective ovals) are subject to processing at the PDCP layer 420. The radio bearers 902 can include SRBs and DRBs. The PDCP layer 420 includes a robust header compression and decompression (ROHC) logic 904, a security logic 906, and an inter-cell scheduling logic (which is provided by the data distribution logic 720 depicted in FIG. 8, for example).

The data distribution logic 720 determines, at radio bearer setup, whether a radio bearer (SRB or DRB) is to be communicated by a macro cell or a small cell. In some examples, the data distribution logic 720 can determine that all SRBs are to be handled by the macro eNB 104, while all DRBs are to be handled by the LeNB 108-1. However, it is possible for DRBs to be split between the macro eNB 104 and the LeNB 108.

Radio bearers (SRBs or DRBs) to be handled by the macro eNB 104 are steered by the inter-cell scheduling logic 720 along respective paths 908 to the RLC layer 418 in the macro eNB 104. On the other hand, DRBs to be steered to the LeNB 104-1 are routed along respective paths 910 to the LeNB 108-1.

The RLC layer 418 includes segmentation and ARQ logic 912, which processes data received over paths 908 from the PDCP layer 420.

Data from the RLC layer 418 is carried in respective logical channels 914 to the MAC layer 416 in the macro eNB 104. The MAC layer 416 includes unicast scheduling and priority handling logic 916, multiplexing logic 918, and HARQ logic 920. Data from the MAC layer 416 are carried in respective transport channels 922.

The functionalities of the logic 904, 906, 912, 916, 918, and 920 are described in various 3GPP Specifications.

Although not shown, the RLC layer 712 and MAC layer 710 (FIG. 8) of the LeNB 108-1 has similar components as the RLC layer 418 and MAC layer 416, respectively, shown in FIG. 9.

Figure 10A:
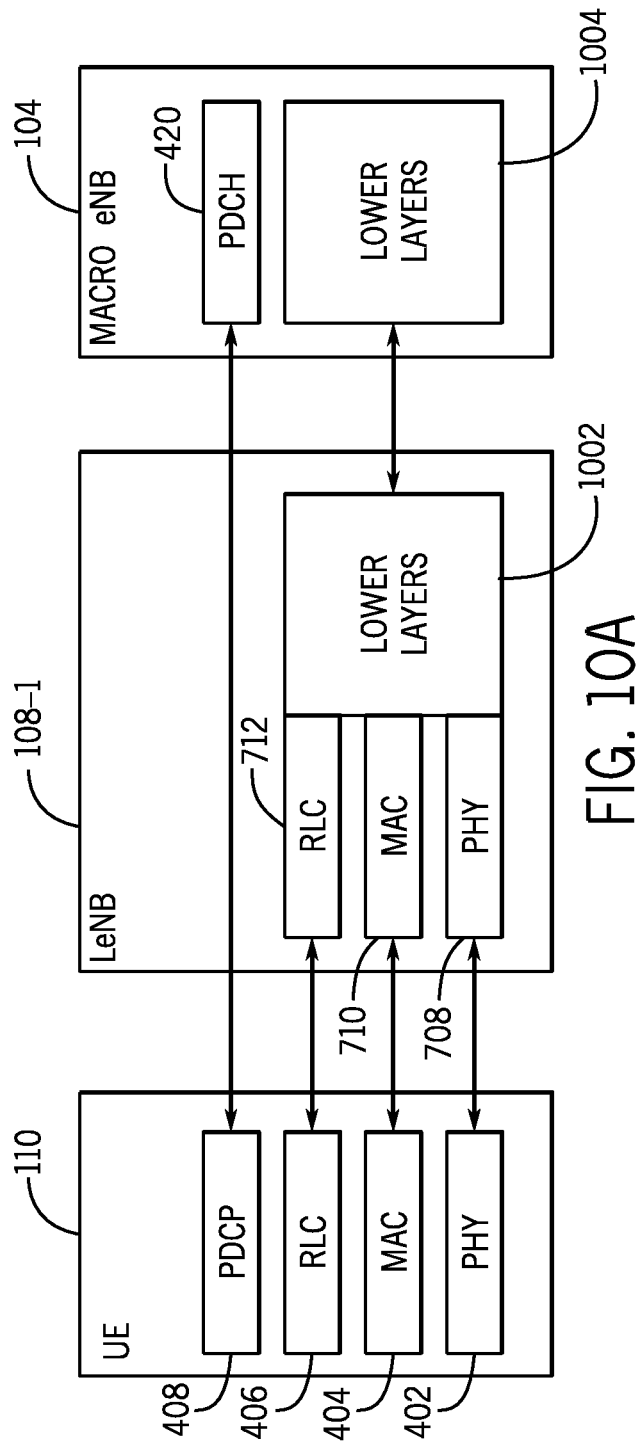

FIG. 10A shows protocol layers in the UE 110, LeNB 108-1, and macro eNB 104 according to split design 2. The UE 110 includes the PDCP layer 408, RLC layer 406, MAC layer 404, and physical layer 402. The RLC layer 406, MAC layer 404, and physical layer 402 of the UE 110 interact with the corresponding RLC layer 712, MAC layer 710, and physical layer 708 of the LeNB 108-1. The PDCP layer 408 in the UE 110 interacts with the PDCP layer 420 in the macro eNB 104.

In addition, the LeNB 108-1 has lower protocol layers 1002 for interacting with corresponding lower protocol layers 1004 in the macro eNB 104, to enable communication between the LeNB 108-1 and the macro eNB 104. These lower protocol layers 1002 and 1004 can implement the X3 interface (backhaul link 116 of FIG. 1) between the LeNB 108-1 and the macro eNB 104.

Figure 10B:
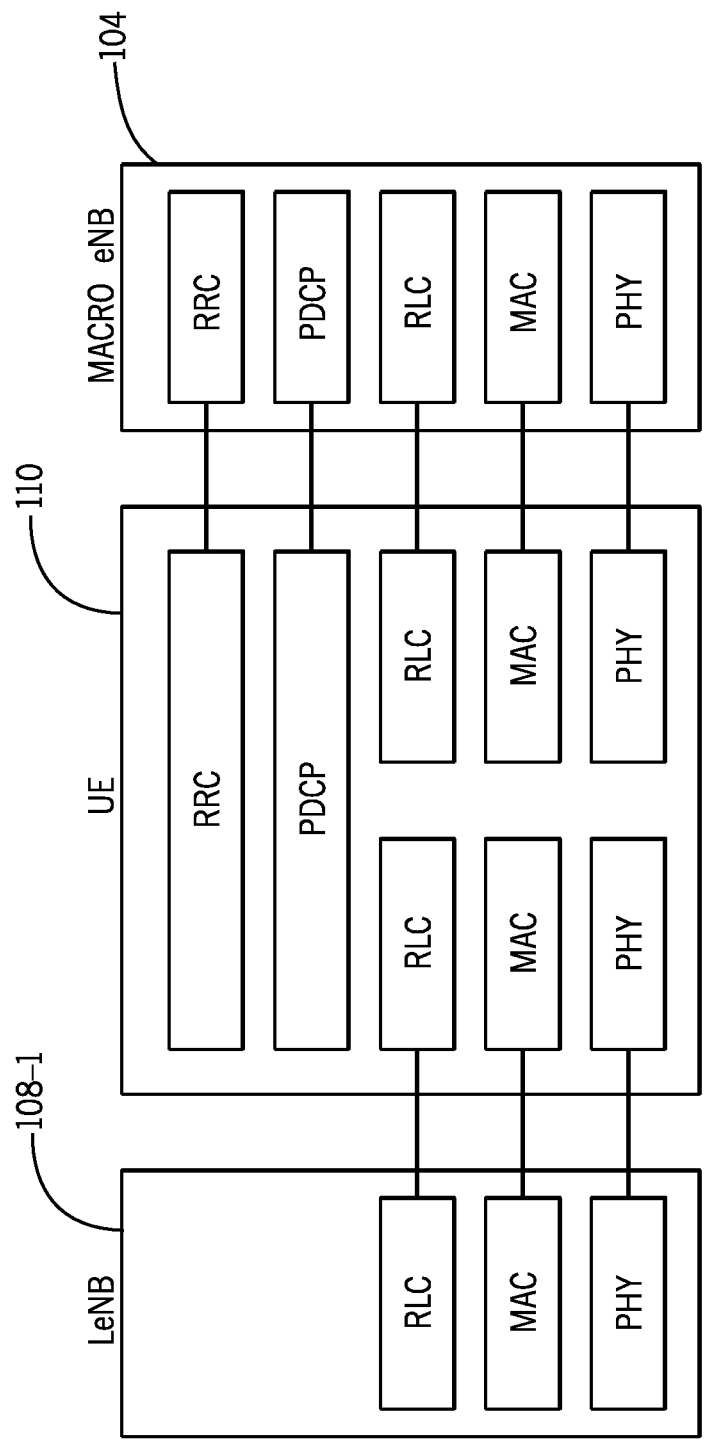

FIG. 10B provides a different view of the protocol layers in the UE 110, LeNB 108-1, and macro eNB 104. In FIG. 10B, the UE 110 is shown to have two sets of RLC/MAC/PHY layers to communicate with the respective LeNB 108-1 and macro eNB 104.

Split Design 3

Figure 11:
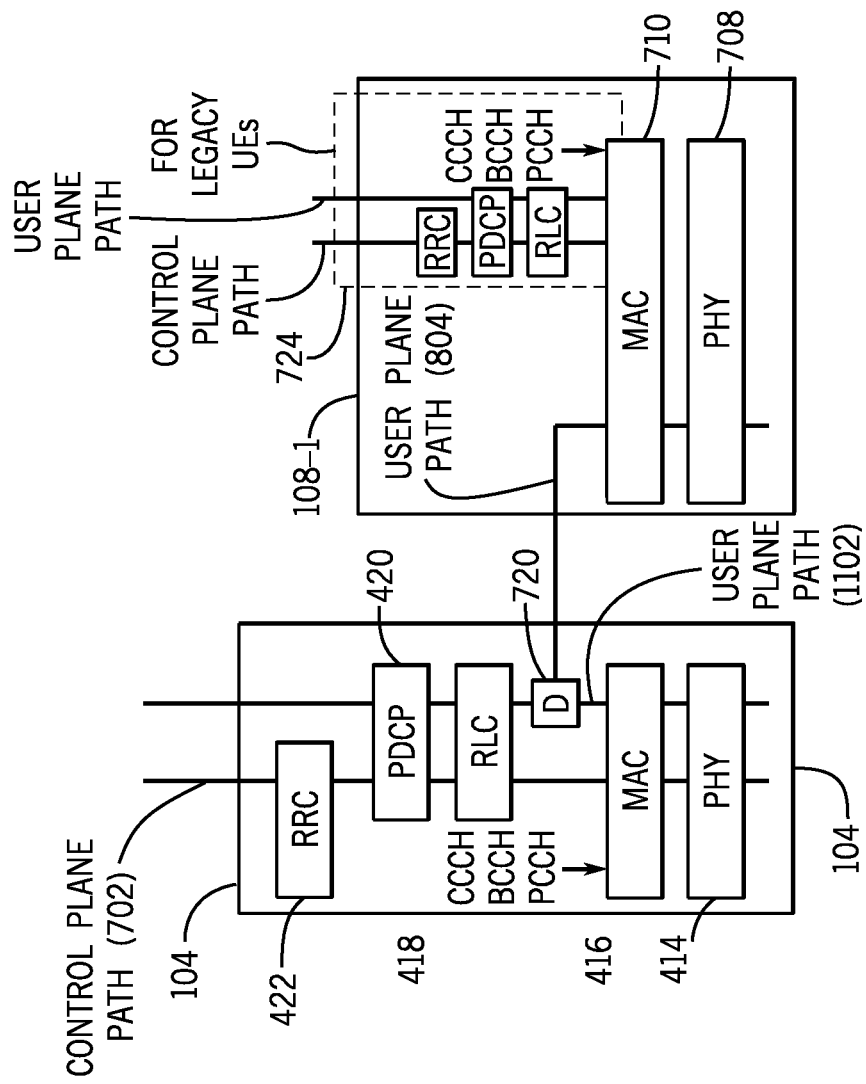

In split design 3, the user plane protocol stack is split right below the RLC layer 418 in the macro eNB 104, as shown in FIG. 11. The split occurs at a splitting point between the RLC layer 418 and the MAC layer 416 in the macro eNB 104. In this split design, a single PDCP layer 420 and RLC layer 418 are provided in the macro eNB 104. User plane data going to the small cell is split after the RLC layer 418 in the macro eNB 104. The data distribution logic 720 (to provide inter-cell data scheduling) is implemented to determine if the RLC packets are to be handled by the macro eNB 104 or the LeNB 108-1. Split design 3 also allows a retransmitted RLC packet to be sent to a cell other than the original RLC packet, thus better leveraging the changing channel conditions between the macro cell and the small cell.

Split design 3, however, may not preserve the tighter interaction between the MAC and RLC layers in case of large backhaul latency between the macro cell and the small cell. The RLC PDU size is provided to the RLC layer over the backhaul interface by the MAC layer. On the other hand, split design 3 does allow RLC context transfer. RLC does not have to be reset in handover from one LeNB to another LeNB under the coverage of the same macro eNB. The transmission at the target LeNB continues from the last RLC PDU at the source LeNB when the MAC/PHY protocol stack is re-established at the target LeNB. The macro eNB is the central node that holds a retransmission buffer, where RLC packets can be retransmitted to the UE (if in RLC Acknowledge Mode) following handover to the target NodeB.

The split below the RLC layer 418 results in a first user plane path 1102 and a second user plane path 1104. The first user plane path 1102 extends from the RLC layer 418 through the MAC layer 416 and physical layer 414. The second user plane path 1104 extends from the RLC layer 418 in the macro eNB 104 through the MAC layer 710 and physical layer 7108 in the LeNB 108-1. In implementations according to split design 3, the data distribution logic 720 can be provided in the RLC layer 418 to steer data between the macro cell and small cell.

Figure 12:
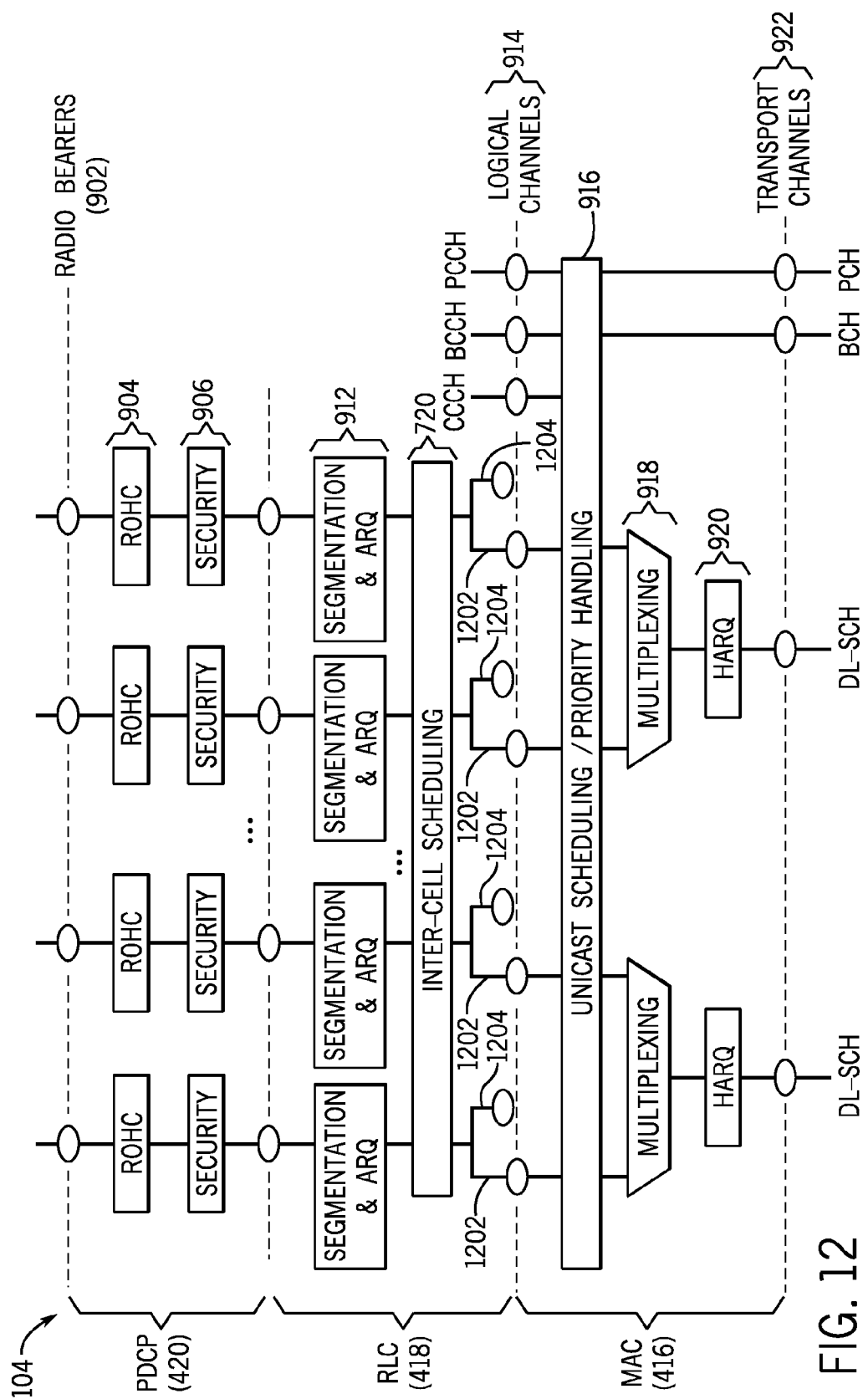

FIG. 12 shows further details of the protocol layers of the macro eNB 104 according to split design 3. As depicted in FIG. 12, the inter-cell scheduling logic (provided by the data distribution logic 720) is included in the RLC layer 418, rather than in the PDCP layer 420 shown in FIG. 9 for split design 2. The inter-cell scheduling logic 720 can steer SRBs or DRBs along paths 1202 for data to be transmitted to the UE by the macro eNB 104, or along paths 1204 for data to be routed through the LeNB 108-1 for transmission to the UE.

The remaining modules of the protocol stacks are similar to corresponding modules depicted in FIG. 9.

Figure 13A:
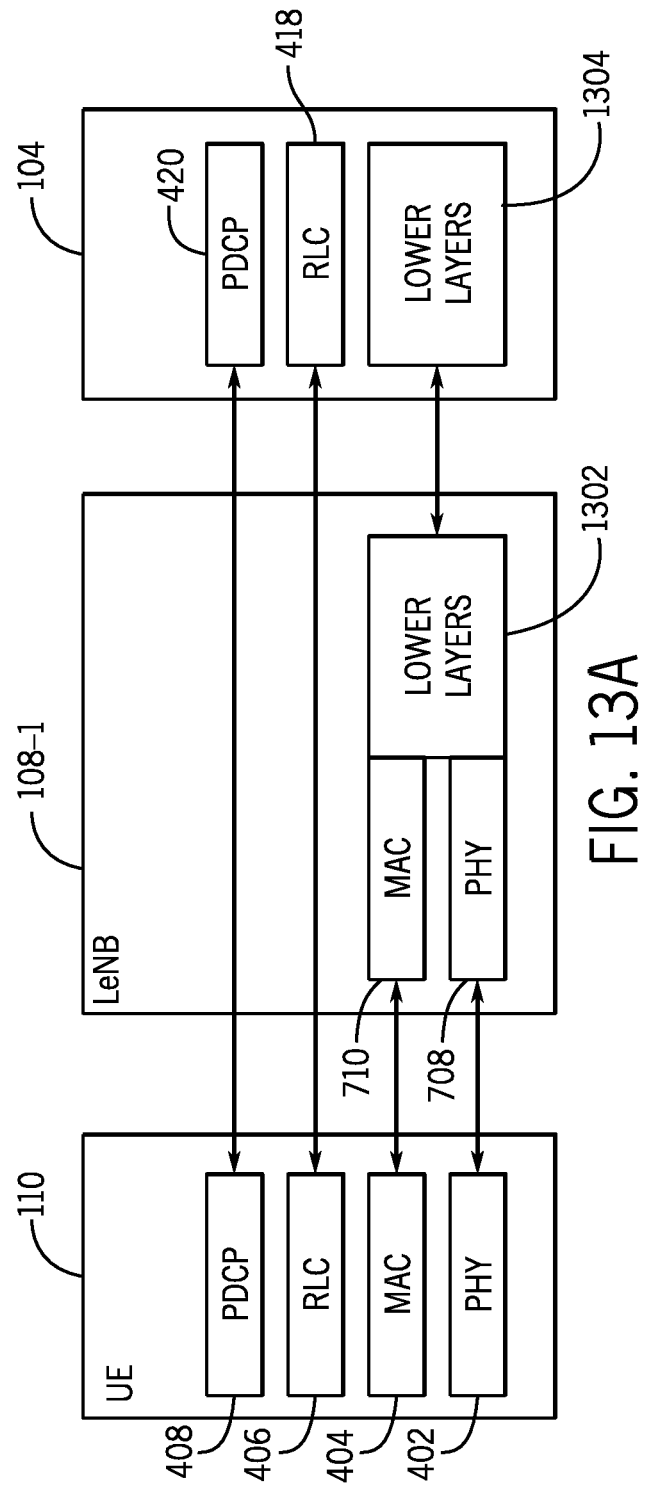

FIG. 13A shows protocol stacks implemented in the UE 110, LeNB 108-1, and macro eNB 104 for split design 3.

The arrangement of FIG. 13A is similar to the arrangement depicted in FIG. 10A for split design 2, except in FIG. 13A, the LeNB 108-1 includes just the MAC layer 710 and the physical layer 708. Lower layers 1302 in the LeNB 108-1 are provided to interact with corresponding lower layers 1304 in the macro eNB 104.

Figure 13B:
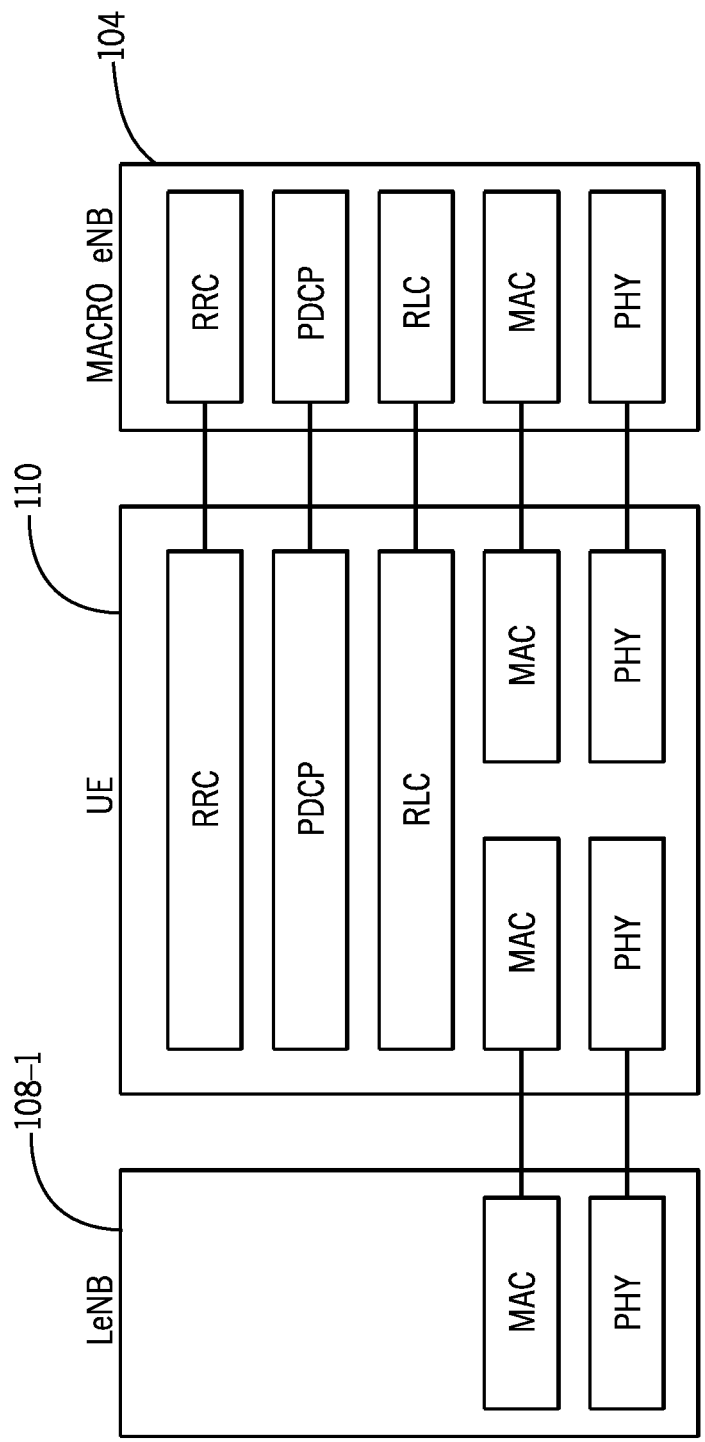

FIG. 13B provides a different view of the protocol layers in the UE 110, LeNB 108-1, and macro eNB 104. In FIG. 13B, the UE 110 is shown to have two sets of MAC/PHY layers to communicate with the respective LeNB 108-1 and macro eNB 104.

Since the user plane protocol stack split occurs after the RLC layer 418 in split design 3, RLC context transfer is enabled during handover between small cells. For example, the RLC layer in the macro eNB 104 can include a retransmission buffer to store RLC PDUs that are to be retransmitted in the target cell after handover.

Dividing the RLC layer and MAC layer between the macro eNB 104 and the LeNB 108-1 does not allow for simpler coordination and tighter interaction between the RLC layer and MAC layer in the LeNB 108-1 that is available with split designs 1 and 2.

Split Design 4

Figure 14:
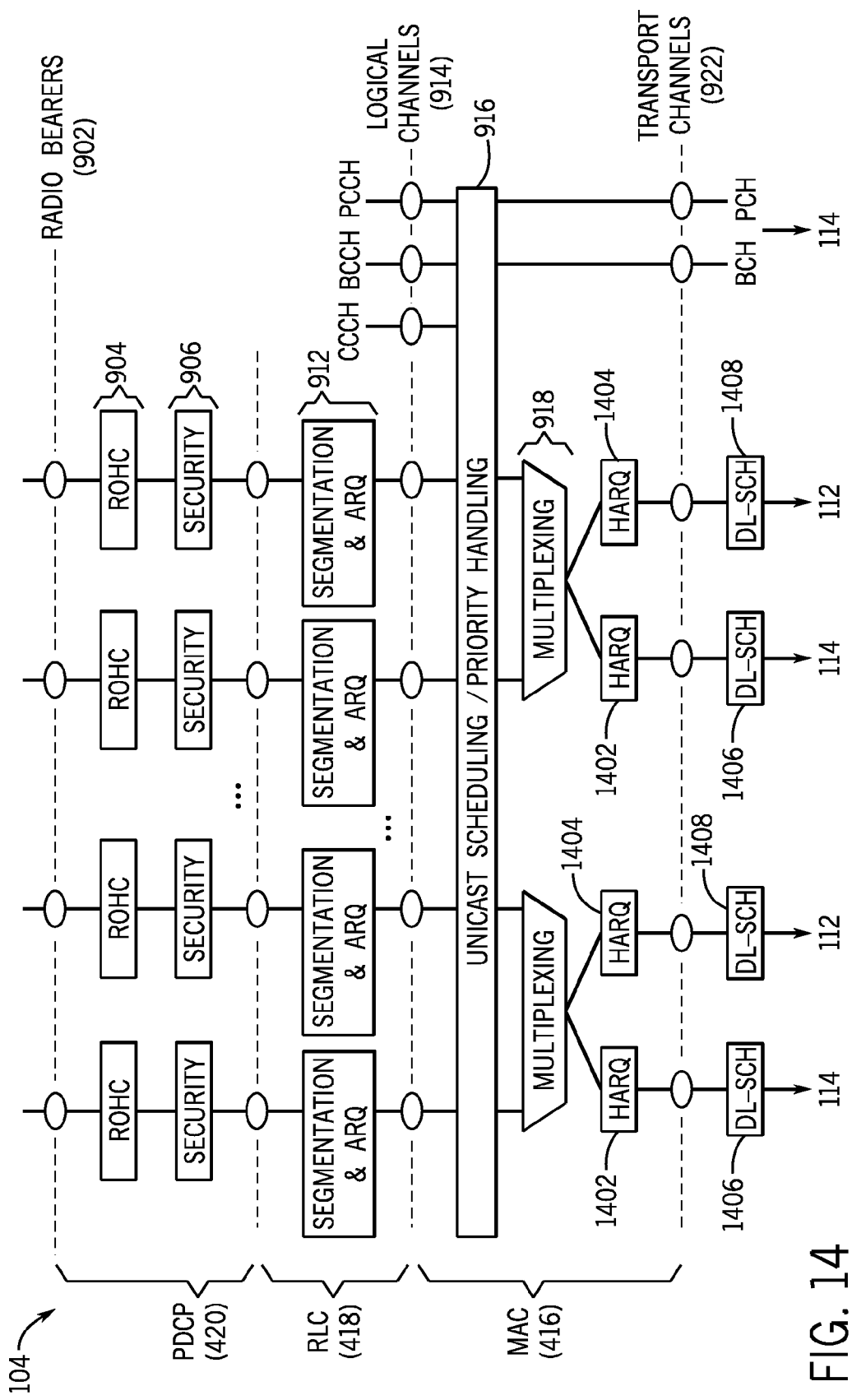

Split design 4 is shown in FIG. 14, in which the user plane protocol stack is split right after the MAC layer 416 in the macro eNB 104. The split occurs at a splitting point between the MAC layer 416 and the physical layer 414 in the macro eNB 104. Data of a radio bearer (SRB or DRB) from a UE is scheduled by the MAC at the macro eNB to be sent over either the macro cell or the small cells. With split design 4, there is only one MAC layer, which resides in the macro eNB 104. The MAC layer 416 in the macro eNB 104 can send data selectively over one the two separate physical layers in the macro eNB and the LeNB.

In the MAC layer 416, each multiplexing logic 918 is associated with two HARQ modules 1402 and 1404. Each HARQ module 1402 provides data on a respective DL-SCH transmitted by the physical layer 414 of the macro eNB 104 over the wireless connection 114 between the macro eNB 104 and the UE. On the other hand, each HARQ module 1404 provides data on a DL-SCH 1408 that is transmitted by the physical layer 708 of the LeNB 108-1 over the wireless connection 112 between the LeNB 108-1 and the UE. Scheduling to steer data between the two paths can occur in the multiplexing logic 918.

Local Wireless Access Network Nodes Outside Coverage Area of Macro Cell

The foregoing discussion referred to LeNBs that are within the coverage area of a macro cell. However, when an LeNB is out of the coverage area of any macro cell, the LeNB is configured to handle both control plane data and user plane data. As a result, the LeNB that is outside the coverage area of a macro cell can be configured with NAS, RRC, PDCP, RLC, MAC, and physical layers to enable the LeNB to handle control plane data and user plane data.

Figure 15:
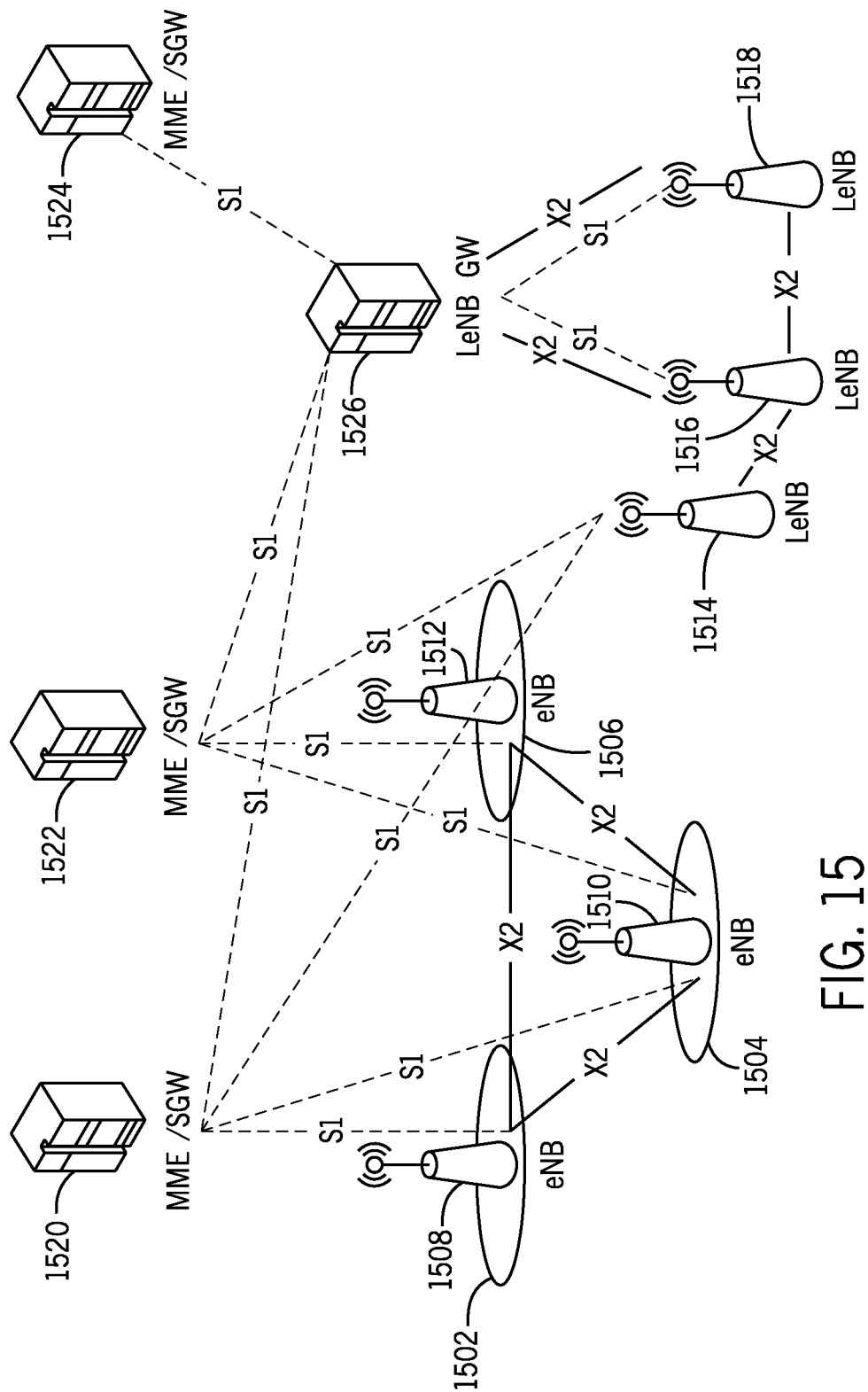
FIG. 15 illustrates another example arrangement that includes macro wireless access network nodes and local wireless access network nodes, according to further implementations.

FIG. 15 illustrates an example arrangement that includes LeNBs that are outside the coverage area of any macro cell.

FIG. 15 shows macro cells 1502, 1504, and 1506, which are supported by respective macro eNBs 1508, 1510, and 1512. In addition, FIG. 15 shows LeNBs 1514, 1516, and 1518 that are outside the coverage area of any macro eNB.

The LeNB 1514 is an LeNB that operates in a first mode. In the first mode, the LeNB 1514 connects to core network nodes directly. In FIG. 15, three sets 1520, 1522, and 1524 of core network nodes are shown, where each set includes an MME and an SGW (collectively referred to as "MME/SGW"). As shown in FIG. 15, the LeNB 1514 (that operates in the first mode) connects over S1 links with MME/SGW 1520 and MME/SGW 1522. There is no gateway provided between the LeNB 1514 and the MME/SGW 1520 and MME/SGW 1522.

The LeNBs 1516 and 1518 operate in a second mode that is different from the first mode. In the second mode, a cluster of LeNBs (1516 and 1518 in the example of FIG. 15) is associated with a gateway 1526, referred to as an LeNB GW in FIG. 15. The LeNB GW 1526 is deployed to support the cluster of LeNBs 1516 and 1518, and the LeNB GW 1526 serves as an intermediary between the LeNBs 1516, 1518 and the respective core network nodes (including MMEs/SGWs 1520, 1522, and 1524).

As with typical eNBs, the LeNBs 1514, 1516, and 1518 can be connected with each other over X2 interfaces.

The LeNBs 1516 and 1518 are connected by S1 interfaces to the LeNB GW 1526. The LeNB GW 1526 is in turn connected over an S1 interface with each MME/SGW 1520, 1522, or 1524.

Provision of the LeNB GW 1526 (or multiple LeNB GWs) allows the core network to support a relatively large number of LeNBs in a scalable manner (since the core network does not have to connect to LeNBs that are associated with LeNB GW(s). The LeNB GW 1526 can be connected to the core network in a way that mobility of UEs across small cells served by LeNBs associated with the LeNB GW 1526 is unlikely to involve inter-MME handovers.

For the control plane, the S1-MME interface (the S1 interface to an MME) from the LeNB 1516 or 1518 may be terminated at the LeNB GW 1526. In the control plane, the LeNB GW 1526 appears to an LeNB as an MME, while the LeNB GW 1526 appears to the MME as an eNB.

For the user plane, the S1-U interface (the S1 interface to an SGW) from the LeNB 1516 or 1518 may be terminated at the LeNB GW 1526. In the control plane, the LeNB GW 1526 appears to an LeNB as an SGW, while the LeNB GW 1526 appears to the SGW as an eNB.

Figure 16:
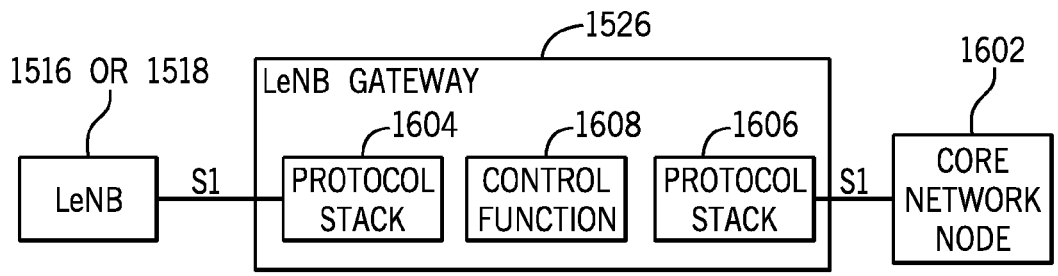
FIG. 16 is a block diagram of modules in a gateway node according to alternative implementations.

FIG. 16 is a block diagram of an example arrangement that includes the LeNB GW 1526, an LeNB 1516 or 1518, and a core network node 1602 (e.g. MME or SGW). The arrangement of FIG. 16 differs from a home eNB arrangement, since the small cells provided by LeNBs are deployed by a cellular operator that also deploys the other network nodes of a mobile communications network (including the core network nodes and macro eNBs). In addition, small cells provided by LeNBs are generally available to subscribers of the cellular operator, rather than just to specific home users.

The LeNB GW 1526 includes a protocol stack 1604 to communicate over an S1 interface to the LeNB 1516 or 1518. The LeNB GW 1526 includes another protocol stack 1606 to communicate over an S1 interface to the core network node 1602. In addition, the LeNB GW 1526 includes a control function 1608 that can perform various tasks as discussed further below.

Figure 17:
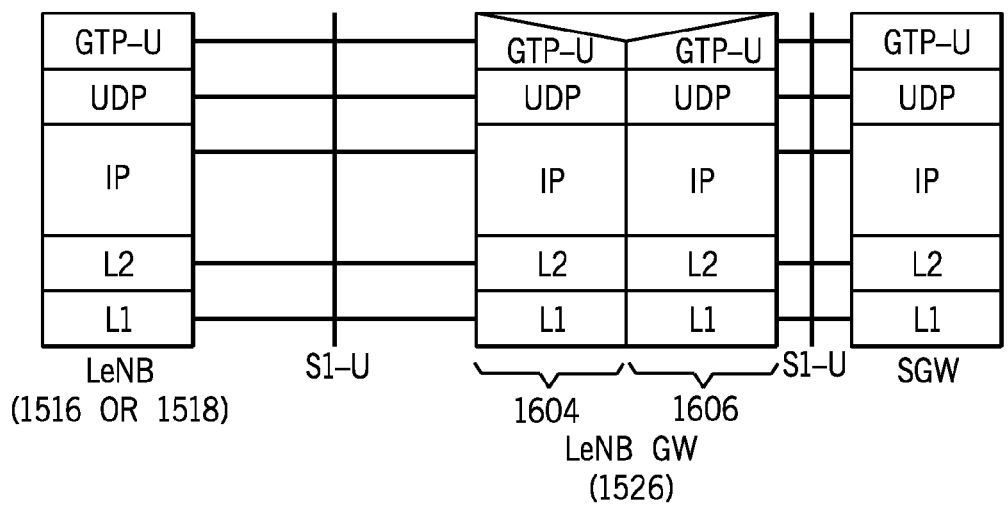
FIGS. 17 and 18 are block diagrams of protocol layers in a local wireless access network node, a gateway node, and core network nodes, according to further implementations.

FIG. 17 depicts protocol stacks in the LeNB 1516 or 1518, LeNB GW 1526, and an SGW for the user plane. The LeNB GW 1526 provides a relay function to relay user plane data between the LeNB and the SGW. In the user plane, each of the protocol stack 1604 and 1606 of the LeNB GW 1526 includes the following layers: layer 1 (L1 or physical layer), layer 2 (L2 or link layer), Internet Protocol (IP) layer, User Datagram Protocol (UDP) layer, and GTP-U layer (GTP layer for the user plane). Each of the LeNB 1516 or 1518 and the SGW also includes the same layers. These protocol layers (L1, L2, IP, UDP, GTP-U) collectively enable communication over the S1-U interface between the LeNB and LeNB GW 1526, and the S1-U interface between the LeNB GW 1526 and the SGW.

Figure 18:
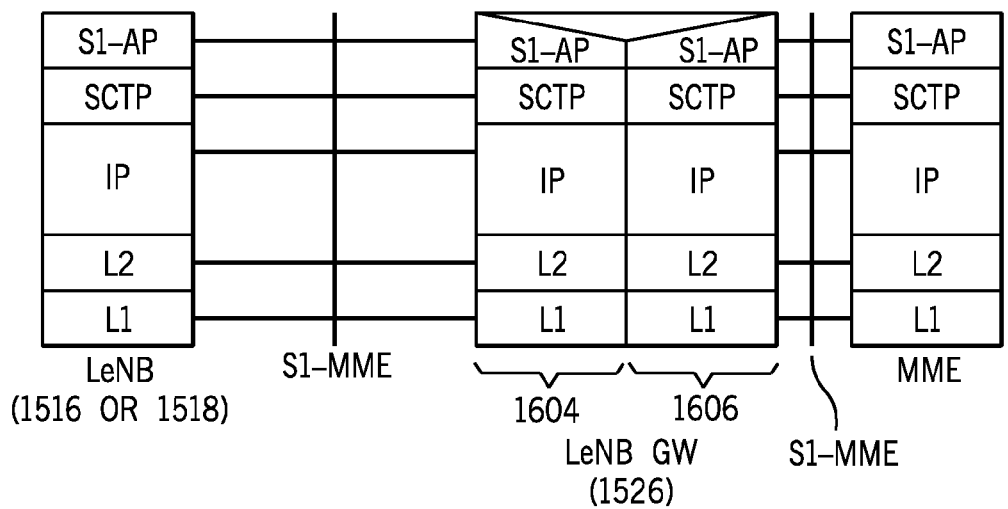

FIG. 18 depicts protocol stacks in the LeNB 1516 or 1518, LeNB GW 1526, and an MME for the control plane.

The S1-MME protocol stacks with the LeNB GW is shown in FIG. 18. When the LeNB GW 1526 is present, the LeNB GW 1526 terminates non-UE-dedicated procedures—in other words, the MME does not see the LeNB, and the LeNB does not see the MME. The LeNB GW 1526 provides a relay function for relaying control plane data between the LeNB and the MME.

In the control plane, each of the protocol stack 1604 and 1606 includes the following layers: L1, L2, IP, Stream Control Transmission Protocol (SCTP) layer (SCTP is a transport layer protocol), and an S1-Application Protocol (S1-AP) layer (which provides a signaling service between an access network and the core network).

These protocol layers (L1, L2, IP, SCTP, S1-AP) collectively enable communication over the S1-MME interface between the LeNB and LeNB GW 1526, and the S1-MME interface between the LeNB GW 1526 and the MME.

The control function 1608 in the LeNB GW 1526 can perform various tasks, as discussed below. Certain cluster-wide signaling can be controlled by the control function 1608—the cluster-wide signaling is transmitted by the small cells in the cluster supported by the LeNB GW 1526. An example of cluster-wide signaling can include a System Information Block (SIB) that is broadcast by each LeNB or included in RRC messaging. An SIB can carry various system parameters, such as those for specifying a frequency-division duplex (FDD) or time-division duplex (TDD) mode of operation, component carriers for a small cell, and so forth.

In addition, the control function 1608 in the LeNB GW 1526 can control the provision of a synchronization signal so that all small cells in a cluster are synchronized for more efficient mobility management and interference coordination.

Moreover, the control function 1608 can broadcast capabilities of the LeNB GW 1526 to UEs, so that each UE can simplify cell selection/reselection procedures, cell attachment procedures, and so forth, since the UE is informed that parameters associated with the foregoing procedures are centrally determined and shared by the small cells.

Further, certain macro eNB tasks can be performed by the control function 1608 in the LeNB GW 1526. For example, mobility between small cells under the same LeNB GW 1526 can be performed using an intra-eNB handover procedure. The control function 1608 in the LeNB GW 1526 can assist with small cell selection, if a link quality measurement such as a Reference Signal Received Power (RSRP) or a Reference Signal Received Quality (RSRQ) is passed to the LeNB GW 1526 to facilitate the cell selection.

In certain deployment scenarios, the backhaul link between LeNBs and the LeNB GW 1526 has a relatively low latency, due to the close proximity between the LeNB GW 1526 and the LeNBs. Thus a centralized dynamic or semi-dynamic data distribution/scheduling function may be included in the control function 1608 in the LeNB GW 1526 to schedule data to a UE through one or multiple LeNBs that are within the cluster of the LeNB GW 1526.

Distributing or steering data through selected LeNB(s) may allow for better interference coordination among the LeNBs connected to the LeNB GW 1526. For example, when a UE is within the coverage of two LeNBs, to avoid downlink interference, dynamic LeNB selection may be performed by the LeNB GW 1526 based on the radio link quality feedback from the UE. This can improve the data throughput of the UE.

Due to the central position of the LeNB GW 1526 with respect to the LeNBs in the cluster of the LeNB GW 1526, the control function 1608 can also perform functions currently assumed by an X2 interface, thus reducing (or avoiding) the establishment of X2 links between small cells. FIG. 15 depicts example X2 links between the LeNB GW 1526 and the LeNBs 1516 and 1518.

In addition, inter-cell interference coordination (ICIC) between neighboring small cells can be handled by the control function 1608 in the LeNB GW 1526, so that frequency domain resources can be shared between neighbor small cells without interference. In addition to ICIC signals to coordinate allocation of PDSCH resources to small cells, the control function 1608 in the LeNB GW 1526 can also assist with enhanced PDCCH (ePDCCH) resource allocation, so that interference is avoided or reduced for both control and data channels.

Other tasks, such as load balancing, mobility robustness, mobility optimization, and so forth, can also be centrally coordinated by the control function 1608 in the LeNB GW 1526. With such central coordination, a UE can benefit in terms of reduced measurement and reporting, lower interference, and better mobility performance.

For the user plane, downlink data packets for UEs can be stored at the LeNB GW 1526. When a UE transitions from idle mode to connected mode, or when transfers between small cells, any buffered downlink packets in the LeNB GW 1526 can be routed to the proper small cell. Similarly, uplink data packets from a UE can be collected and stored at the LeNB GW 1526 before passed to the destination.

Adaptation of Operation Modes

Small cells can be deployed under various different conditions. For example, a small cell can be deployed in a location with macro cell coverage or in a location without macro cell coverage. As another example, a small cell can be deployed in a dense or sparse region of small cells. Additionally, it may be beneficial for an LeNB to adapt over time after deployment to changing conditions.

In accordance with some implementations, an LeNB can be selectively configured to operate in any of multiple different modes of operation. Four example modes (A, B, C, and D) are described below. Although reference is made to four example modes, it is noted that in other examples, more modes or less modes can be used.

Mode A is used if an LeNB is deployed without an LeNB GW and in a location without macro cell coverage. In mode A, the LeNB is configured to have the full function of a normal eNB, and behaves as a standalone eNB. For example, the full protocol stack (including all of the PDCP, RLC, MAC, and physical layers as well as control plane protocol layers such as the RRC and NAS layers) is enabled. The full protocol stack allows the LeNB to handle both control plane and user plane without assistance from a macro eNB or an LeNB GW. In addition, in this LeNB, its protocol stack to the S1 interface to the core network is enabled such that the LeNB can communicate with the core network directly over S1 interface, without an LeNB GW or macro eNB as an intermediary.

Mode B is used for an LeNB deployed with an LeNB GW but without macro cell coverage. In mode B, the LeNB is configured to have the full function of a normal eNB. For example, the full protocol stack (including all of the PDCP, RLC, MAC, and physical layers as well as control plane protocol layers) is enabled so that the LeNB can handle both control plane and user plane data. However, since the LeNB GW is present, the LeNB does not connect to core network directly, but instead connects over an S1 interface to the LeNB GW that provides a relay function between the LeNB and core network.

For an LeNB deployed with macro cell coverage, the LeNB can either be configured with its full protocol stack enabled (mode C) or with a partial protocol stack enabled (mode D). If the full protocol stack is enabled in mode C, the LeNB can handle both control plane and user plane data. In mode C, the corresponding macro eNB can serve the function of an LeNB GW in the sense that the macro eNB provides the relay function between the LeNB and the core network for both the control plane and user plane. The interface between LeNB and the macro eNB can be an S1 interface, and the interface between LeNBs can be an X2 interface.

In mode D, a partial protocol stack is enabled for an LeNB deployed with macro cell coverage. The partial protocol stack causes the LeNB to have reduced functionality. Enabling a partial protocol stack can refer to enabling some of the protocol layers in the LeNB while disabling other protocol layer(s). The LeNB with the partial protocol stack can handle just user plane data communicated with a UE, and does not handle control plane data. The control plane data is handled by the macro eNB. The partial protocol stack may omit one or more of the following protocol layers: PDCP layer, RLC layer, and MAC layer, depending on which of the split designs is used as discussed further above. In this mode of operation, the interface between LeNB and the macro eNB is the X3 interface. Between LeNBs under the same macro eNB, an interface similar to the X2 interface can be established for direct handover between LeNBs.

To reduce deployment cost, it is desirable to allow the LeNB to operate in a variety of deployment conditions, and to operate adaptively as conditions change after deployment. In some implementations, an LeNB can be built with the full functionality of a normal eNB. This LeNB is configurable to operate in any of modes A, B, C, and D discussed above.

Initial configuration of the operating mode and modification of the operating mode can be achieved using operation and maintenance (O&M) procedures. For example, to change from mode A to mode B, the LeNB can be instructed to switch the S1 interface from the core network towards an LeNB GW. To change from mode A to mode C, the LeNB can be instructed to switch the S1 interface from the core network towards the macro eNB. To change from mode C to mode D, the LeNB can be instructed to reconfigure its internal processing and interface functionalities.

Figure 19:
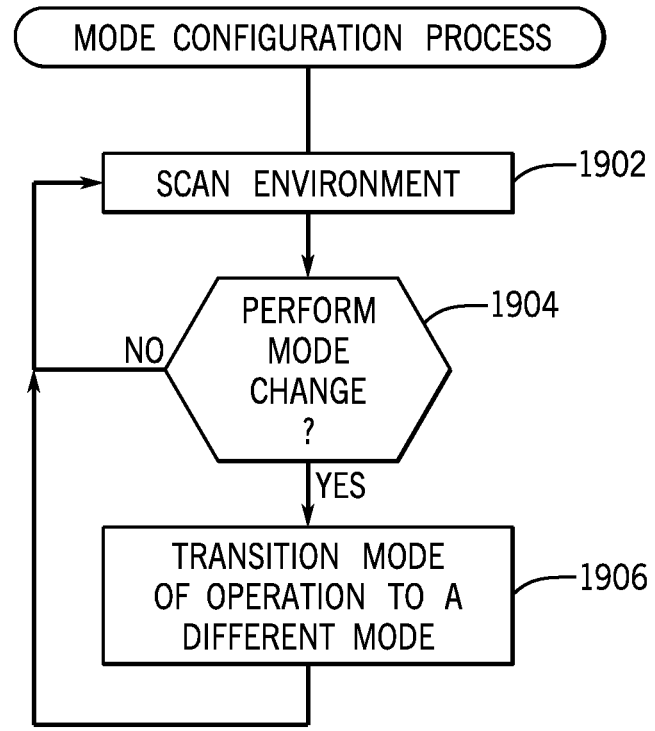
FIG. 19 is a flow diagram of a mode configuration process according to further implementations.

FIG. 19 is a flow diagram of a mode configuration process for an LeNB, in accordance with some implementations. The LeNB scans (at 1902) its environment to check for certain conditions. For example, the LeNB can check for presence of a macro eNB or an LeNB GW. The LeNB can also check for other environmental conditions, such as interference levels from other small cells (which can provide some indication of sparcity and denseness of deployment of small cells). The LeNB can perform the scan periodically, or in response to a trigger event (e.g. loss of communication with a macro eNB or LeNB GW, a command from another node, etc.).

Based on the determined environmental conditions, the LeNB can determine (at 1904) whether a mode change is to be performed, and if so, which mode the local eNB is to transition to. The determination at 1904 can be performed by the local eNB. Alternatively, the local eNB can send a report of the determined environmental conditions to another node (e.g. MME, macro eNB, LeNB GW), for the other node to make the determination of whether a mode change is to be performed, and if so, which mode the local eNB is to transition to.

In response to determining that the mode change is to occur, the LeNB transitions (at 1906) to another mode.

In general, a method of adaptive operation of a local wireless access network node comprises scanning an environment condition, and in response to the scanned environment condition, changing a mode of operation of the local wireless access network node.

In some implementations, changing the mode of operation includes changing from a first mode in which a protocol stack of the local wireless access network node is fully enabled, to a second mode in which the protocol stack is partially enabled.

The local wireless access network node is set in the first mode in response to the environment condition indicating that the local wireless access network node is outside a coverage area of a macro wireless access network node and a gateway is unavailable.

Alternatively, the local wireless access network node is set in the first mode in response to the environment condition indicating that the local wireless network node is connected to the gateway.

As another alternative, the local wireless access network node is set in the first mode in response to the environment condition indicating that the local wireless access network node is within the coverage area of the macro wireless access network node.

According to further implementations, the local wireless access network node is changed to the second mode in response to the environment condition indicating that the local wireless access network node is within the coverage area of a macro wireless access network node.

Changing the operating mode can include selecting an operating mode from among: (1) a first mode in which the local wireless access network node is outside the coverage area of a macro wireless access network node and a gateway is unavailable; (2) a second mode in which the local wireless access network node is attached to a gateway; (3) a third mode in which the local wireless access network node is within the coverage area of a macro wireless access network node but the local wireless access network node is to be provided with full protocol stack functionality; and (4) a first mode in which the local wireless access network node is within the coverage area of a macro wireless access network node, and user plane data is to be offloaded to the local wireless access network node.

BRIEF DISCUSSION OF VARIOUS FEATURES DESCRIBED ABOVE

In general, a method comprises communicating, by a network component, a first data unit with a local wireless access network node, to cause the local wireless access network node to send the first data unit over a first wireless connection between the local wireless access network node and a user equipment. The network component communicates a second data unit over a second wireless connection with the user equipment, where the second data unit contains data that is different from data in the first data unit, and where the second wireless connection is established simultaneously with the first wireless connection.

In some implementations, the first and second wireless connections are logical connections.

In some implementations, the first and second wireless connections are physical connections.

In some implementations, the network component is coupled to a plurality of local wireless access network nodes, and the network component coordinates operations of the plurality of local wireless access network nodes.

In some implementations, the first data unit contains user plane data, and the second data unit contains control plane data.

In some implementations, communicating the first data unit with the local wireless access network node includes communicating the first data unit over a wired backhaul link between the network component and the local wireless access network node.

In some implementations, the network component controls mobility operations of the user equipment between the local wireless access network node and at least another local wireless access network node.

In some implementations, a data distribution logic in the network component determines whether a third data unit is to flow to the user equipment over a first path that includes the local wireless access network node or a second path that includes the second wireless connection between the network component and the user equipment. The third data unit is selectively sent over one of the first path and the second path based on the determining.

In some implementations, the first path and second path are split at a splitting point in a protocol stack of the network component.

In some implementations, the splitting point is above a Packet Data Convergence Protocol (PDCP) layer in the network component.

In some implementations, the splitting point is between a Packet Data Convergence Protocol (PDCP) layer and a Radio Link Control (RLC) layer in the network component.

In some implementations, the splitting point is between a Radio Link Control (RLC) layer and a Medium Access Control (MAC) layer in the network component.

In some implementations, the splitting point is between a Medium Access Control (MAC) layer and a physical layer in the network component.

In some implementations, the local wireless access network node is within a coverage area of a cell provided by the network component.

In some implementations, a tunnel for carrying data of the user equipment is terminated at the network component without extending to the local wireless access network node.

In general, a user equipment includes a communication interface to establish simultaneous wireless connections with a macro wireless access network node and a local wireless access network node, and at least one processor to communicate a first data unit over a first of the wireless connections with the local wireless access network node, and communicate a second data unit over a second of the wireless connections with the macro wireless access network node, wherein the first data unit contains data different from data in the second data unit.

In some implementations, the user equipment includes protocol layers including a first layer to communicate control plane data with the macro wireless access network node without communicating control plane data with the local wireless access network node, and a second layer to communicate user plane data with the local wireless access network node.

In some implementations, a third layer is to communicate user plane data with the macro wireless access network node.

In general, a gateway node includes a first communication interface to a local wireless access network node deployed by a cellular operator and that provides a coverage area for wireless communication with a user equipment (UE), where the first interface includes protocol layers that cause the gateway node to appear as a core network node to the local wireless access network node. A second communication interface is to the core network node, where the second communication interface includes protocol layers that cause the gateway node to appear as a wireless access network node to the core network node.

In some implementations, each of the first and second communication interfaces is configured to communicate over a Long-Term Evolution (LTE) S1 interface.

In some implementations, the first communication interface is to communicate with a plurality of local wireless access network nodes that are part of a cluster associated with the gateway node, and the gateway node further includes a control function to send cluster-wide signaling to the local wireless access network nodes.

In some implementations, the first communication interface is to communicate with a plurality of local wireless access network nodes that are part of a cluster associated with the gateway node, and the gateway node further includes a control function to send a synchronization signal to the local wireless access network nodes to synchronize the local wireless access network nodes.

In some implementations, the first communication interface is to communicate with a plurality of local wireless access network nodes that are part of a cluster associated with the gateway node, and the gateway node further includes a control function to coordinate mobility of the UE between cells supported by the local wireless access network nodes.

In some implementations, the first communication interface is to communicate with a plurality of local wireless access network nodes that are part of a cluster associated with the gateway node, and the gateway node further includes a control function to perform inter-cell interference coordination among cells provided by the local wireless access network nodes.

User Equipment Mobility Between eNBs

In scenarios where LeNBs (of respective small cells) are under the coverage of a macro eNB, efficiency of UE mobility across different cells is desired. Procedures can be provided to implement UE mobility between a macro cell and a small cell or between two small cells. Efficiency can be achieved by reduced signaling to the core network as well as improved handover performance.

Traditionally, handover of a UE involves nodes in a core network, such as the MME and SGW in an LTE core network. As a result, signaling overhead can be increased since messages have to be exchanged with the core network nodes during a handover.

In accordance with some implementations, techniques or mechanisms are provided to improve mobility efficiency during transfer of a UE between a macro cell and a small cell or between small cells. Note that a UE transfer from a macro cell to a small cell in the contexts discussed herein involve a UE transfer in which the UE maintains its wireless connection (or more specifically, its radio connection at least for the control plane traffic) with the macro eNB after the UE transfer, as well as establishes another wireless connection (or more specifically, another radio connection for user plane traffic) with the LeNB of the small cell that the UE is to be transferred to.

UE transfer between small cells refers to a UE transfer where the UE maintains its radio connection at least for the control plane with the macro eNB, but switches its radio connection for all or part of its user plane traffic to a different small cell.

In accordance with some implementations, to perform a UE transfer as discussed above, a data offload feature is provided over the X3 interface (also referred to as an X2e interface) between a macro eNB and an LeNB. Various functions and associated procedures over the X3 interface are provided to improve efficiency of mobility of a UE between a macro cell and a small cell, as well as between small cells within the coverage area of the macro cell. New messages can be associated with the offload functions and associated procedures, where these new messages can be communicated over the X3 interface.

As discussed above, a UE under the coverage of a macro cell and a small cell can be served by both the macro cell and the small cell; in other words, the UE has dual radio connections with the respective macro eNB and LeNB. In such a scenario, the macro eNB provides the control plane functions, while the LeNB can provide the bulk of user plane functions for the dual connection capable UE.

A connection to a small cell can be added or removed from a UE under the control of the macro eNB. The action of adding or removing a radio connection to an LeNB for a UE can be transparent to the core network, including the MME and SGW in an LTE core network, for example. A legacy UE (a UE that is incapable of performing dual radio connections with a macro eNB and an LeNB) can be connected to either a macro cell or a small cell. To support UEs not capable of performing dual connections with a macro eNB and an LeNB, a small cell can be considered to be a normal cell that has all eNB functionalities.

When a dual connection capable UE moves into a small cell coverage area that is within the coverage of a serving macro cell for the UE, a dual connection can be established for the UE with both the macro cell and the small cell. As noted above, the UE maintains its radio connection with the macro eNB, and the UE establishes a second radio connection with the LeNB of the small cell. The two radio connections may or may not be simultaneous. At least a portion of the data traffic for the UE can be offloaded from the macro cell to the small cell. The establishment and teardown of the second radio connection with the LeNB can be transparent to the core network. As a result, signaling overhead in the core network due to UE mobility between a macro cell and a small cell is reduced.

Figure 20:
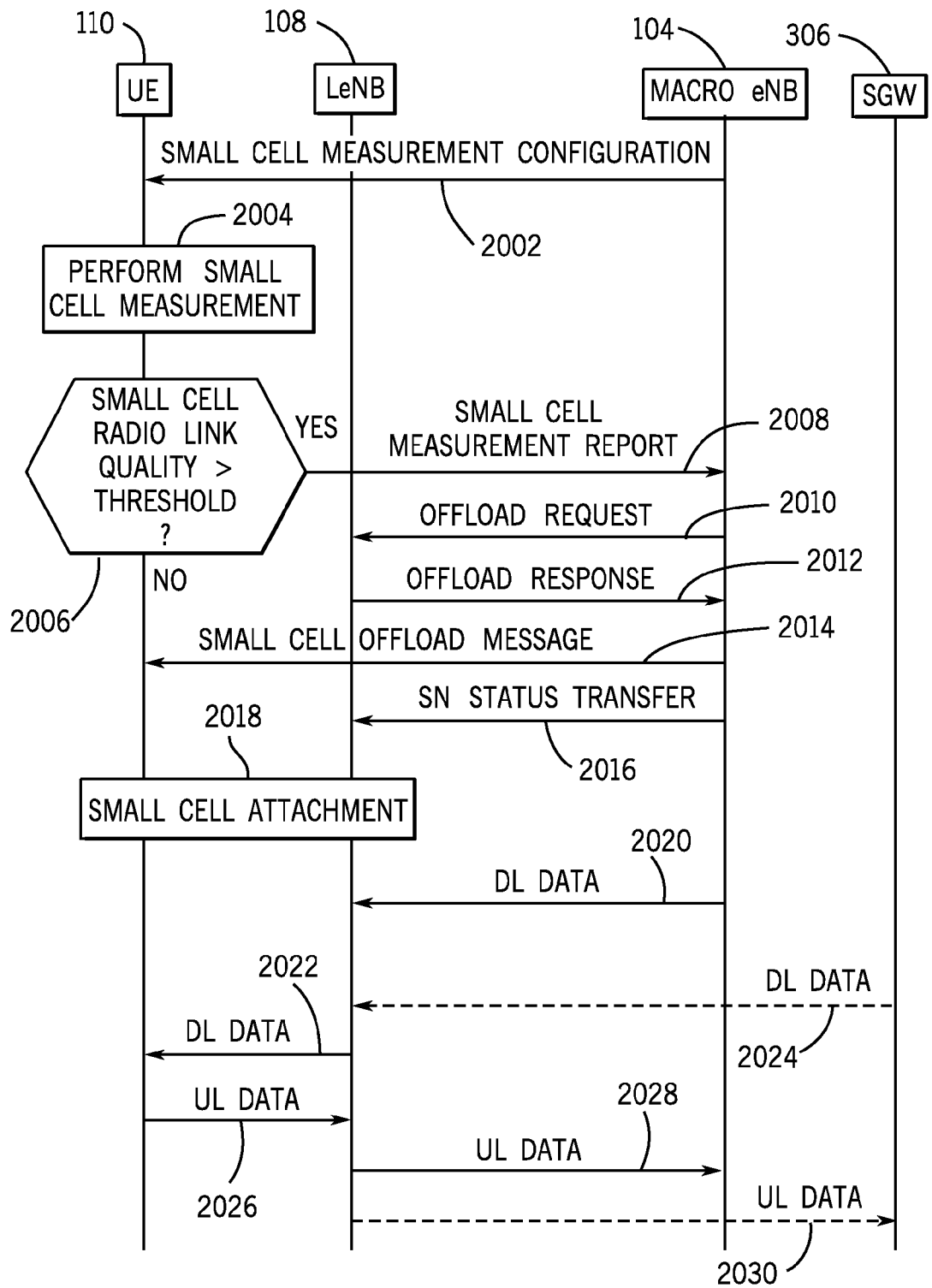
FIG. 20 is a message flow diagram of a data offload process, according to some implementations.

FIG. 20 is a message flow diagram illustrating exchange of messages among the following nodes for performing data offload from the macro eNB 104 to the LeNB 108: UE 110, LeNB 108, macro eNB 104, and SGW 306. In some implementations, a data offload to a small cell does not involve any communication with the SGW 306. In other implementations, as discussed further below in connection with FIG. 20, the SGW 306 may be involved in data offload to a small cell.

As depicted in FIG. 20, the macro eNB 104 sends (at 2002) a small cell measurement configuration message to the UE 110. The small cell measurement configuration message configures the UE 110 to perform measurement of radio links to one or more small cells, at the carrier frequency (or frequencies) of the respective small cell(s). In response to the small cell measurement configuration message, the UE 110 performs (at 2004) a small cell measurement. If the UE detects (at 2006) that a small cell radio link quality is greater than a specified threshold, then the UE 110 sends (at 2008) a small cell measurement report that contains measurement data to the macro eNB 104. The small cell measurement report can include an indication of a strength of a radio link with a given small cell (or with multiple small cells), and can identify the small cell (or small cells).

Based on the small cell measurement report from the UE 110, the macro eNB 104 can determine that the UE 110 is within the coverage area of a small cell, and thus, can initiate the offloading of at least a portion of data traffic to the small cell. Offloading at least a portion of the data traffic can include offloading data traffic associated with certain radio access bearers. A radio access bearer can refer to an E-UTRAN (Evolved Universal Terrestrial Radio Access Network) Radio Access Bearer (E-RAB), which is used to transport data between a UE and a core network node, such as the SGW. A data radio bearer (DRB) is used to transport the data of the E-RAB between a UE and an eNB. Reference to offloading a radio access bearer can refer to either offloading a given E-RAB or the corresponding DRB.

The macro eNB 104 sends (at 2010) an Offload Request message to the LeNB 108 that is part of the small cell to which data offload is to be performed. The Offload Request message can be sent over the X3 interface between the macro eNB 104 and the LeNB 108. The Offload Request message can include certain information, including information identifying the radio access bearer(s) to be offloaded, UE profile information (to identify the UE that is the subject of the data offload), quality-of-service (QoS) profile information (to describe the QoS associated with communications with a UE 110), and other information.

In response to the Offload Request, the LeNB 108 can send (at 2012) an Offload Response to the macro eNB 104. The Offload Response can also be sent through the X3 interface. The Offload Response can indicate whether the LeNB 108 has accepted or denied the Offload Request. In situations where the Offload Response indicates that the LeNB 108 has accepted the Offload Request, the Offload Response can further identify the radio access bearer(s) that is (are) accepted by the LeNB 108. Note that the LeNB 108 can accept just a subset of the radio access bearers identified in the Offload Request from the macro eNB 104. Alternatively, the LeNB 108 can accept all of the radio access bearers identified in the Offload Request.

In situations where the Offload Response indicates that the Offload Request has been denied, the Offload Response can identify a cause of the denial. Specific messages to accept or deny an Offload Request are discussed further below.

In some examples, the Offload Response can also include random access information, including a dedicated preamble. The random access information, including the dedicated preamble, can be used by the UE to perform a random access procedure with the LeNB 108 to establish a radio connection with the LeNB 108. A dedicated preamble can be used by the UE 110, and not by other UEs, to perform the random access procedure to establish the radio connection with the LeNB 108.

In further examples, the Offload Response can also include system information, including certain information included in system information blocks (SIBs) and/or a master information block (MIB). The random access information and system information is sent back in the Offload Response to the macro eNB 104 to allow the macro eNB 104 to forward the random access information and system information to the UE 110 for use by the UE 110 for establishing a radio connection with the LeNB 108.

If the Offload Response indicates that the Offload Request has been accepted, the macro eNB 104 can send (at 2014) a Small Cell Offload message to the UE 110, to instruct the UE 110 to start the establishment of a second radio connection with the small cell identified in the Small Cell Offload message. The Small Cell Offload message can include information about the small cell that is to be used by the UE 110 to establish the second radio connection with the small cell. For example, the information an include the random access information and the system information that was included in the Offload Response from the LeNB 108 to the macro eNB 104.

In cases where the PDCP layer is implemented in the LeNB 108, such as in the FIG. 7 arrangement discussed above, then the macro eNB 104 can also send (at 2016) a sequence number (SN) Status Transfer message, which includes a sequence number (SN) of a PDCP PDU and a hyper frame number of the last PDCP PDU that is to be sent to the small cell.

In response to the Small Cell Offload message sent at 2014, the UE 110 performs (at 2018) an attachment procedure with the LeNB 108, for establishing a radio connection with the LeNB 108. In the small cell attachment procedure, the UE 110 can send a PRACH with the dedicated preamble that was included in the Small Cell Offload message.

After sending of the Offload Response (at 2012) indicating acceptance of the Offload Request, the LeNB 108 is ready to receive data from and transmit data to the macro eNB 104. After receipt of the Offload Response (at 2012) accepting the Offload Request, the macro eNB 104 can send (at 2020) downlink data for the UE 110 to the LeNB 108. The downlink data can be sent from the macro eNB 104 to the LeNB 108 over the X3 interface. In response to the downlink data received at 2020, the LeNB 108 can forward (at 2022) the downlink data to the UE 110. In alternative implementations, the macro eNB 104 can direct the LeNB 104 to receive downlink data for the UE 110 directly from the SGW 306. In this case, the macro eNB 104 can inform the SGW 306 that the UE 110 has two eNB connections, one with the macro eNB 104 and the other with the LeNB 108. In such implementations, the data offload is not transparent to the SGW 306.

The UE 110 can also send (at 2026) uplink data to the LeNB 108. The LeNB 108 in turn forwards (at 2028) the uplink data to the macro eNB 104. In alternative implementations, the LeNB 108 can be directed by the macro eNB 104 to transfer the uplink data (at 2030) directly to the SGW 306.

In some implementations, the macro eNB can send an Offload Request to each of multiple small cells for the UE 110 if the UE 110 is in the coverage areas of the multiple small cells. In such a scenario, the macro eNB 104 may receive Offload Responses from more than one small cell accepting the Offload Request. If that is the case, then the macro eNB 104 can select one of the small cells that sent Offload Responses accepting the Offload Request. After the selection, the macro eNB 104 can send an Offload Cancel message to the un-selected small cell(s) to cancel the previously sent Offload Request at the un-selected small cell(s). When an Offload Cancel message is received by an LeNB, the LeNB can release resources that were previously reserved for the data offload.

In other scenarios, a target small cell that may have received an Offload Request can cancel an ongoing data offload by sending an Offload Cancel Request message to the macro eNB 104. In response to the Offload Cancel Request message, the macro eNB 104 can send an Offload Cancel message to the requesting small cell.

In other examples, a macro eNB can cancel an ongoing data offload by sending an Offload Reconfiguration Request message to a small cell. Generally, an Offload Reconfiguration Request message can be used by the macro eNB 104 to add or remove one or more radio access bearers from an ongoing data offload in a small cell. The Offload Reconfiguration Request message can also terminate a data offload, such as in the case of a UE moving out of the coverage area of the small cell.

Figure 21:
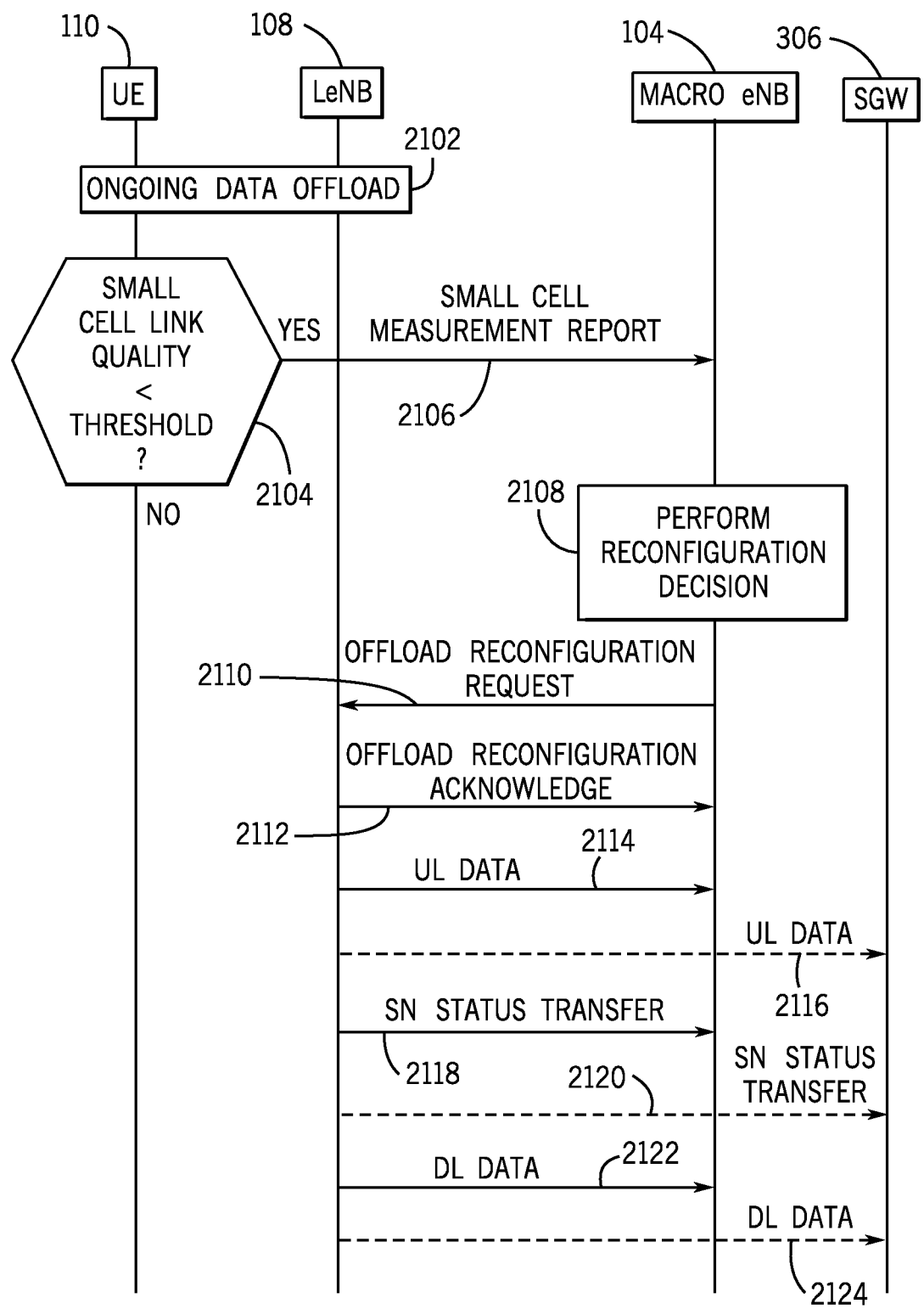
FIG. 21 is a message flow diagram of a data offload reconfiguration process, according to some implementations.

FIG. 21 is a message flow diagram that illustrates an offload reconfiguration procedure. In FIG. 21, an ongoing data offload is occurring (at 2102), where the data offload involves the UE 110, the LeNB 108, and the macro eNB 104.

The UE at some point can detect (at 2104) that the radio link quality to the LeNB 108 has dropped below a specified threshold. If that is the case, the UE 110 sends (at 2106) a small cell measurement report to the macro eNB 104 indicating that the radio link quality of the small cell has dropped below the specified threshold.

The macro eNB 104 can then perform a reconfiguration decision (at 2108) to reconfigure the data offload. The macro eNB 104 then sends (at 2110) an Offload Reconfiguration Request message to the LeNB 108, where the Offload Reconfiguration Request message identifies radio access bearer(s) to be removed. The Offload Reconfiguration Request message can remove all of the radio access bearers or just some of the radio access bearers that were previously offloaded from the macro eNB 104 to the LeNB 108.

In response to the Offload Reconfiguration Request message, the LeNB 108 sends (at 2112) an Offload Reconfiguration Acknowledge message, to acknowledge the Offload Reconfiguration Request message. Any uplink data for the removed radio access bearer(s) can be sent (at 2114) from the LeNB 108 to the macro eNB 104. In alternative implementations, the macro eNB 104 can configure the LeNB 108 to send (at 2116) the uplink data for the removed radio access bearer(s) directly to the SGW 306.

In arrangements where the PDCP layer is provided at the LeNB 108, such as in the arrangement depicted in FIG. 7, the LeNB 108 can also send an SN Status Transfer message to the macro eNB 104 (at 2118), or alternatively to the SGW 306 (at 2120).

Any downlink data for the removed radio access bearer(s) that has not yet been transferred from the LeNB 108 to the UE 110 is sent to the macro eNB 104 (at 2122) or to the SGW 306 (at 2124) for forwarding to the UE 110.

In some examples, before the start of small cell data offload, it may be helpful to know the type of eNB that a given adjacent eNB is (an eNB can be of either the following types: macro eNB type and LeNB type). The given eNB may exchange transmission power information with its neighbor eNB, and based on that information, the given eNB may know whether its neighboring eNB is an LeNB or a macro eNB.

A type of a neighbor eNB can also be determined in the following manner. During the configuration stage of an eNB, the eNB may notify its neighboring eNBs about whether or not it can support data offload for other cells—this indicates that the eNB is an LeNB. Notification of a type of an eNB can also be accomplished using an operation and maintenance (O&M) procedure.

Offload Functions and Procedures Over the X3 Interface

To support data offload using a small cell, new functions and procedures can be established over the X3 interface. One such new function is a small cell data offload function (to offload data of a macro cell to a small cell). The data offload function can be associated with respective procedures, which include an offload preparation procedure (to initiate and perform the data offload), a PDCP SN status transfer procedure (to transfer PDCP SN status information), an offload cancel procedure (to cancel an ongoing data offload), and an offload reconfiguration procedure (to modify or cancel an ongoing data offload).

Each procedure is accomplished by exchanging respective messages between the macro eNB and an LeNB. The procedures and their respective messages are listed below in Table 1 and Table 2.

TABLE 1

| Procedure | Initiating Message | Successful Outcome Response message | Unsuccessful Outcome Response message |
|---|---|---|---|
| Offload Preparation | Offload Request | Offload Request Acknowledge | Offload Request Failure |
| Offload Reconfiguration | Offload Reconfiguration Request | Offload Reconfiguration Acknowledge | Offload Reconfiguration Failure |
| Offload Cancel | Offload Cancel Request | Offload Cancel Acknowledge | |

TABLE 2

| Procedure | Initiating Message |
|---|---|
| Offload Preparation Cancel | Offload Cancel |
| SN Status Transfer | SN Status Transfer |

Figure 22:
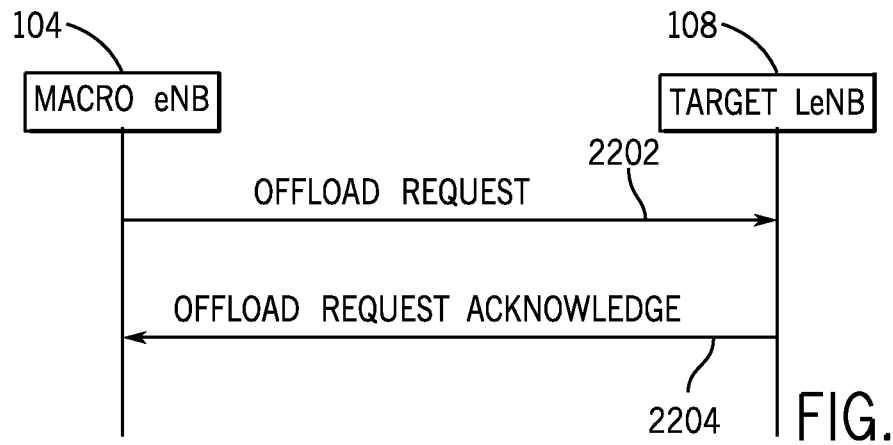
FIGS. 22-27 are message flow diagrams of various offload procedures, according to various implementations.

The following describes a successful operation of an offload preparation procedure. As shown in FIG. 22, the macro eNB 104 initiates the offload preparation procedure by sending (at 2202) an Offload Request message to the target LeNB 108. The message includes a list of radio access bearers (e.g. E-RABs) and the associated QoS parameters that the macro eNB 104 would like to offload to the target small cell. If at least one of the requested E-RABs is accepted by the small cell, the target LeNB reserves the respective resources for the data offload, and sends (at 2204) an Offload Request Acknowledge message back to the macro eNB 104.

The macro eNB 104 can abort the offload preparation procedure if the macro eNB 104 does not receive a response from the target LeNB 108 after a specified time period. The timer implemented for this purpose may take into account the actual backhaul link delay between the macro eNB 104 and target LeNB 108. For example, the timer can choose from a range of time limits, with the range defined between a lower time limit and an upper time limit. A lower time limit can be selected for a relative small delay backhaul link, such as one implemented with an optical cable, while a higher time limit can be selected for a relatively long-delay backhaul link, such as one implemented with a wireless link.

For each E-RAB for which the macro eNB 104 is requesting an offload of the corresponding downlink data, the macro eNB 104 includes a DL Forwarding information element (IE) within an E-RABs To be Setup Item IE of the Offload Request message.

For each E-RAB in the E-RABs To be Setup Item IE for which the macro eNB 104 is requesting acceptance of uplink data transfer from the target LeNB, the macro eNB 104 can include a UL GTP Tunnel Endpoint IE to indicate that the macro eNB 104 is requesting data forwarding, by the LeNB, of uplink data received by the LeNB associated with the respective E-RAB to the macro eNB.

The target LeNB can include the E-RABs for which resources have been prepared at the target LeNB in an E-RABs Admitted List IE for both downlink data and uplink data. The target LeNB can include the E-RABs that have not been admitted in the E-RABs Not Admitted List IE for both downlink and uplink data, with a respective cause value.

For each E-RAB that the target LeNB has decided to admit, the target LeNB may include a DL GTP Tunnel Endpoint IE within the E-RABs Admitted Item IE of the Offload Request Acknowledge message to indicate that the target LeNB accepts the proposed offload of downlink data for this E-RAB and the corresponding address at the LeNB for the macro eNB to forward DL data associated to the E-RAB.

The allocation of resources according to values of an Allocation and Retention Priority IE included in an E-RAB Level QoS Parameters IE can follow the principles described for an E-RAB Setup procedure in 3GPP TS 36.413.

Upon reception of an Offload Request Acknowledge message, the macro eNB 104 can terminate the offload preparation procedure. The macro eNB 104 is then considered to have a prepared data offload.

The Offload Request Acknowledge message may include the dedicated preamble for the UE, other random access (RA) procedure information, and even partial information from an MIB and some SIBs (e.g. SIB1 and SIB2). The Offload Request Acknowledge message may also include other UE-specific radio link configuration information, such as PUCCH information, Sounding Reference Signal (SRS) information, PUSCH information, and so forth.

Although reference is made to data offloading E-RABs in the present discussion, it is noted that data offloading can also be applied to data at other protocol levels.

Figure 23:
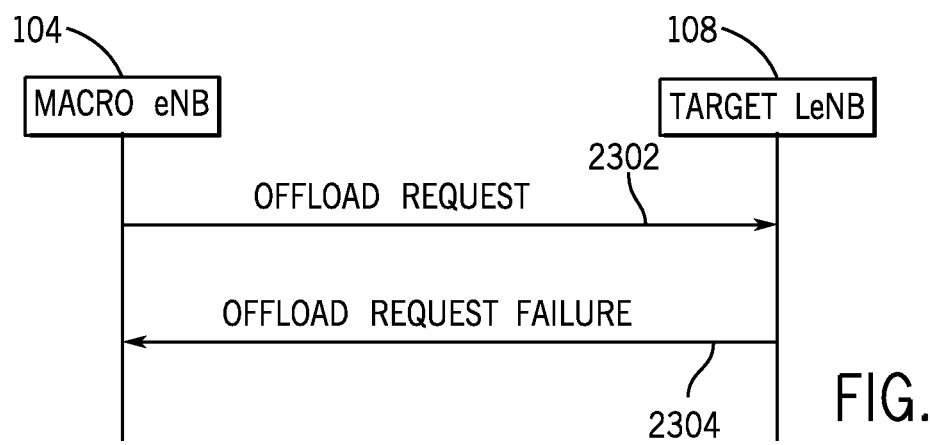

An unsuccessful operation of an offload preparation procedure initiated by an Offload Request message (sent at 2302) is depicted in FIG. 23. If the target LeNB 108 rejects all the requested radio access bearers, or a failure occurs during the offload preparation procedure, the target LeNB 108 can send (at 2304) an Offload Request Failure message to the macro eNB 104. The Offload Request Failure message can include a Cause IE that has a respective value to indicate the cause of the denial.

Figure 24:
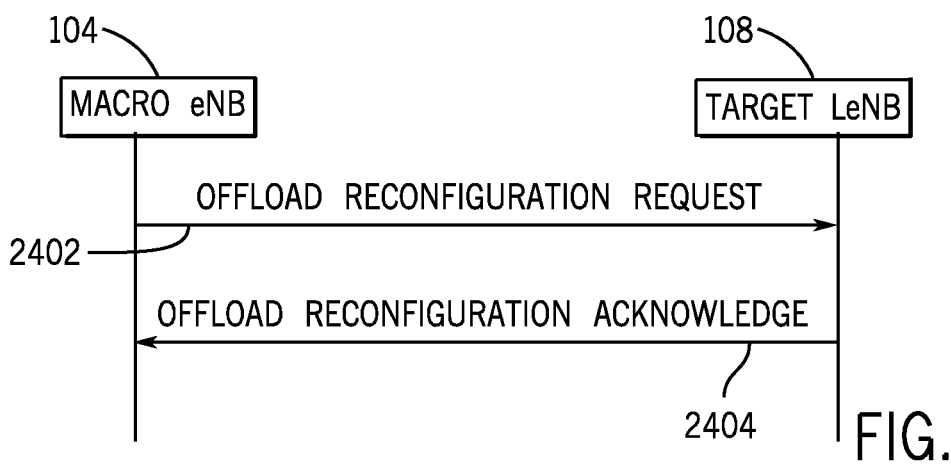

A successful operation of an offload reconfiguration procedure is depicted in FIG. 24. The offload reconfiguration procedure can be used to modify an ongoing data offload, by adding and/or removing radio access bearers. This procedure can also be used to cancel an ongoing data offload if the list of radio access bearers includes all radio access bearers off-loaded to the target LeNB and there is no new radio access bearer to be added.

The macro eNB 104 initiates the offload reconfiguration procedure by sending (at 2402) the Offload Reconfiguration Request message to the target LeNB 108. After the macro eNB 104 sends the Offload Reconfiguration Request message, the macro eNB 104 aborts the offload reconfiguration procedure if the macro eNB 104 does not receive a response from the target LeNB after a specified time period.

For each new E-RAB for which the macro eNB 104 is requesting to do offload of downlink data, the macro eNB 104 can include the DL Forwarding IE within the E-RABs To be Setup Item IE of the Offload Reconfiguration Request message.

For each new radio access bearer in the E-RABs To be Setup Item IE for which the macro eNB 104 is requesting to accept forwarding of uplink data, the macro eNB 104 can include the UL GTP Tunnel Endpoint IE to indicate that the macro eNB 104 is requesting data forwarding of uplink data received by the LeNB for that E-RAB to the macro eNB.

For each E-RAB for which the macro eNB 104 is requesting to remove from offload, the macro eNB 104 can include the DL GTP Tunnel Endpoint IE to indicate that the macro eNB 104 is requesting the small cell eNB to forward any unsent DL data of the E-RAB back to the macro eNB.

The target LeNB sends (at 2404) the Offload Reconfiguration Acknowledge message back to the macro eNB 104 regardless whether any requested new E-RABs are admitted or not. The target LeNB 108 can include the E-RABs for which resources have been prepared at the target LeNB 108 in the E-RABs Admitted List IE. The target LeNB 108 can also include the E-RABs that have not been admitted in the E-RABs Not Admitted List IE with an appropriate Cause value.

For each E-RAB that it has decided to admit, the target LeNB 108 can include the DL GTP Tunnel Endpoint IE within the E-RABs Admitted Item IE of the Offload Reconfiguration Acknowledge message to indicate that target LeNB 108 has accepted the proposed forwarding of downlink data for this E-RAB from the macro eNB to the LeNB.

If none of the new E-RABs requested is admitted or there is no new E-RAB is requested, the target LeNB 108 sends the Offload Reconfiguration Acknowledge message back to the macro eNB 104 to indicate the successful removal of the E-RABs requested.

Upon reception of the Offload Reconfiguration Acknowledge message, the macro eNB 104 terminates the offload reconfiguration procedure.

Figure 25:
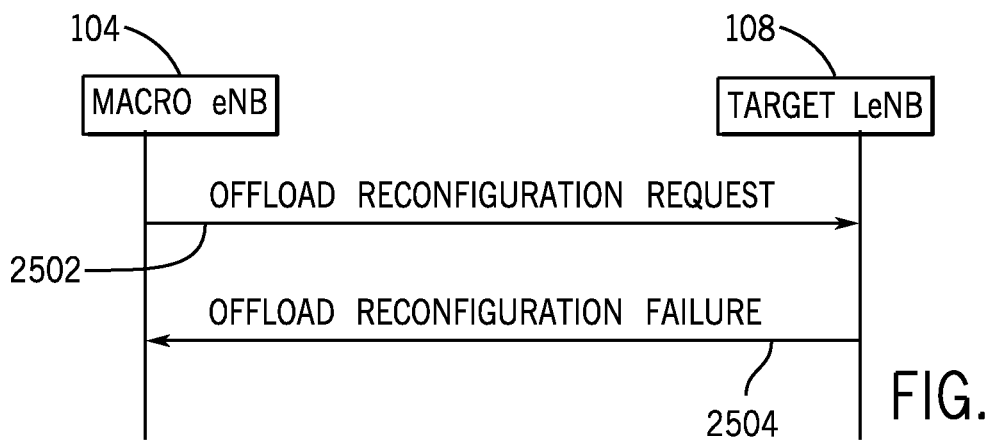

FIG. 25 illustrates an unsuccessful operation of an offload reconfiguration procedure. If a failure occurs during the offload reconfiguration procedure initiated by an Offload Reconfiguration Request message sent (at 2502), the target LeNB 108 sends (at 2504) an Offload Reconfiguration Failure message to the macro eNB 104, where the message contains a Cause IE with a respective value to indicate the cause of the failure.

Figure 26:
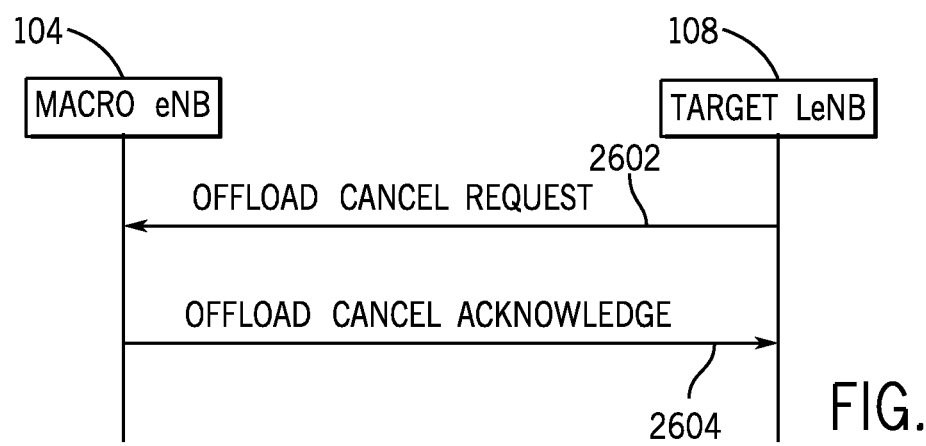

FIG. 26 illustrates an offload cancel procedure. The target LeNB 108 initiates the procedure by sending (at 2602) an Offload Cancel Request message to the macro eNB 104. In response, the macro eNB 104 sends (at 2604) an Offload Cancel Acknowledge message to the target LeNB 108. If the macro eNB 104 wants the target LeNB 108 to transfer any downlink data back to the macro eNB 104, the macro eNB 104 can include the list of E-RABs and the corresponding DL GTP tunnel points. After receiving the Offload Cancel Acknowledge message, the target LeNB can transfer all uplink data (and downlink data if requested) to the macro eNB 104 and releases all resources associated with the data offload.

Upon receiving the Offload Cancel REQUEST message, the macro eNB can trigger the UE 110 to perform measurement. The macro eNB 104 makes the final decision on where the UE 110 is to be transferred to another small cell.

Figure 27:
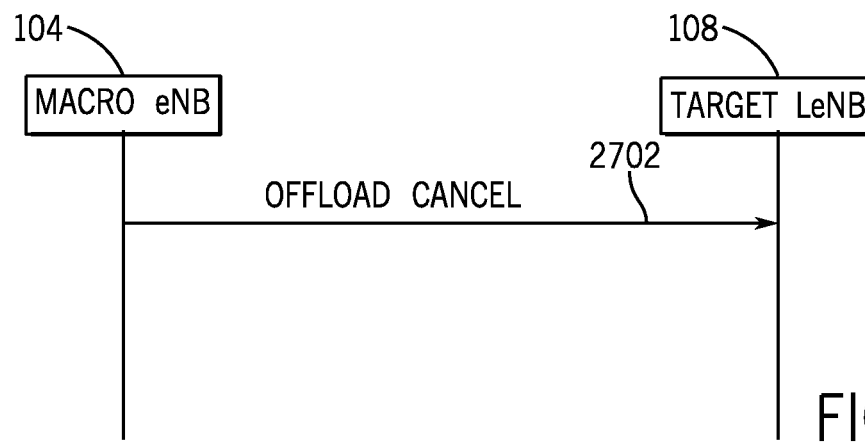

FIG. 27 illustrates an example offload preparation cancel procedure. The macro eNB 104 initiates the procedure by sending (at 2702) the Offload Cancel message to the target LeNB 108. The macro eNB 104 can indicate the reason for cancelling the data offload by including an appropriate Cause value. The reason for the cancellation may be that the macro eNB 104 has initiated an offload preparation procedure with multiple small cells and only one small cell is selected, so the macro eNB 104 has to cancel the offload preparation procedure for the un-selected small cells.

At the reception of the Offload Cancel message, the target LeNB 108 can remove any reference to, and release, any resources previously reserved for the data offload.

The purpose of the SN status transfer procedure is to transfer the downlink PDCP sequence number and hyper frame number transmitter status between eNBs (macro eNB to LeNB or vice versa) for each respective E-RAB for which PDCP sequence number and hyper frame number status preservation applies. The procedure is only applicable when PDCP SDUs are sent to a small cell and the PDCP layer is implemented in the small cell. The procedure is the same as that in the normal handover case.

When the data offload is carried out at lower portions of the protocol stack (below the PDCP layer), the SN status transfer does not have to be a separate step. Instead, the SN status transfer information can be carried as part of another message. Also the sequence numbers transferred can be a PDCP sequence number or an RLC sequence number, depending on the type of packets being offloaded.

Messages to Support Offload Procedures

In some examples, the Offload Request message can include the following IEs:
- Message Type (to identify a type of the message);
- Macro eNB UE X3 ID (identifier allocated to the UE over the X3 interface at the macro eNB);
- SmallCell Cell ID (to identify the small cell that is the subject of the data offload);
- UE Context Information.

The UE Context Information of the Offload Request message includes the following IEs:
- UE Aggregate Maximum Bit Rate (to indicate the maximum bit rate that may be supported for the UE);
- E-RABs To Be Setup List, which includes:
  - E-RABs To Be Setup Item, which in turn includes:
    - E-RAB ID (to identify a specific E-RAB);
    - E-RAB Level QoS Parameters (to indicate QoS for the E-RAB);
    - DL Forwarding (to indicate forwarding of downlink data to the LeNB);
    - UL GTP Tunnel Endpoint (to identify the X3 transport bearer used for forwarding of uplink data);
- Some RRC Context including one or more of the following
  - UE ID (i.e. radio network temporary identifier (RNTI));
  - UE radio capability information.

In case of data distribution before the PDCP layer, the following additional information is included in the Offload Request message as part of the RRC context:
- PDCP configuration
- UE security capability information;
- Security context to be used in the LeNB.

In case that the UE is only capable of a single radio connection in any given subframe, the macro cell and small cell can schedule data to the UE in different subframes. In this case, the macro eNB may also suggest a subframe pattern to the target small cell to use for scheduling data to the UE. Thus a subframe pattern may also be included in the Offload Request message.

The Offload Request Acknowledge message can include the following IEs:
- Message Type;
- Macro eNB UE X3 ID (identifier allocated to the UE over the X3 interface at the macro eNB);
- SmallCell eNB UE X3 ID (identifier allocated to the UE over the X3 interface at the target LeNB);
- E-RABs Admitted List, which includes:
  - E-RABs Admitted Item, which in turn includes:
    - E-RAB ID (to identify an E-RAB that has been admitted);
    - DL GTP Tunnel Endpoint (to identify the X3 transport bearer used for forwarding downlink data to the LeNB);
- E-RABs Not Admitted List (includes one or more E-RAB IDs of E-RAB(s) that has or have not been admitted);
- Common and UE specific radio configurations for the UE in the small cell, which are to be relayed to the UE by the macro-eNB. It can include the following information
  - UE ID assigned in the small cell;
  - Small cell radio resource configurations for the UE including:
    - DRB reconfiguration;
    - MAC layer configuration;
    - Physical channel configurations.

The Offload Request Failure message can include the following IEs:
- Message Type;
- Macro eNB UE X3 ID;
- Cause;
- Criticality Diagnostics (containing diagnostic information).

The Offload Reconfiguration Request message can include the following IEs:
- Message Type;
- Macro eNB UE X3 ID;
- Cause;
- SmallCell Cell ID;
- E-RABs To Be Setup List, which includes:
  - E-RABs To Be Setup Item, which in turn includes:
    - E-RAB ID;
    - E-RAB Level QoS Parameters;
- E-RABs To Be Removed List, which includes:
  - E-RABs To Be Removed Item, which in turn includes:
    - E-RAB ID;
    - DL GTP Tunnel Endpoint.

When an E-RAB is removed, the macro eNB 104 may also request the small cell to forward downlink data associated with the E-RAB to the macro eNB 104. For received uplink data, the small cell can forward all of the uplink data to the macro eNB 104.

The Offload Reconfiguration Acknowledge message can include the following IEs:
- Message Type;
- Macro eNB UE X3 ID;
- Cause;
- SmallCell Cell ID;
- E-RABs Admitted List, which includes:
  - E-RABs Admitted Item, which in turn includes:
    - E-RAB ID.

The Offload Reconfiguration Failure message can include the following IEs:
- Message Type;
- Macro eNB UE ID
- Cause.

The Offload Cancel Request message can include the following IEs:
- Message Type;
- Macro eNB UE X3 ID;
- SmallCell eNB UE X3 ID.

The Offload Cancel Acknowledge message can include the following IEs:
- Message Type;
- Macro eNB UE X3 ID;
- SmallCell eNB UE X3 ID;
- E-RABs List, which includes:
    - E-RABs Item, which in turn includes:
        - E-RAB ID;
        - DL GTP Tunnel Endpoint The Offload Cancel message can include the following IEs:
- Message Type;
- Macro eNB UE X3 ID;
- SmallCell eNB UE X3 ID;
- Cause.

Data Forwarding Between Small Cells

After data offloading from a macro cell to a first small cell has occurred, such as according to the procedure depicted in FIG. 21, there can be scenarios where the UE 110 is to be transferred from the first small cell to a second small cell. In this case, the macro eNB 104 can manage UE transfer of the UE 110 from the first small cell to the second small cell, while maintaining a radio connection between the UE 110 and the macro eNB 104. UE transfer of the UE 110 from the first small cell to the second small cell causes the data offload to be transferred from the first small cell to the second small cell; in other words, handling of at least some radio access bearer(s) is transferred from the first small cell to the second small cell.

The UE transfer of the UE 110 from the first small cell to the second small cell can be initiated by (1) the macro eNB 104 in response to a measurement report from the UE 110 to the macro eNB 104 indicating that the UE 110 should no longer be served by the first small cell; or (2) the LeNB of the first small cell, which can occur due to various reasons, such as to achieve load balancing at the LeNB of the first small cell or for some other reason. The first small cell can initiate a UE transfer by sending an Offload Cancel Request message over the X3 interface to the macro eNB 104.

Once UE transfer is performed from the first small cell to the second small cell, data forwarding can occur. Data forwarding refers to transferring data for the UE 110 from the first small cell to the second small cell, where the transferred data can include either downlink data or uplink data that has not yet been communicated by the first small cell to the appropriate next destination (UE 110 for downlink data and the macro eNB 104 for uplink data). Data forwarding can occur either directly from the first small cell to the second small cell, or indirectly from the first small cell to the second small cell via a shared macro eNB. If the first and second small cells do not share the same macro eNB, then data forwarding may be accomplished indirectly via multiple respective macro eNBs.

Alternatively, instead of performing data forwarding as part of the transfer of the data offload from the first small cell to the second small cell, the UE can first establish a radio link with the second small cell, and then after establishing the radio link with the second small cell, can terminate the radio link with the current small cell. In this way, data forwarding between the first and second small cells does not have to be performed.

Figure 28:
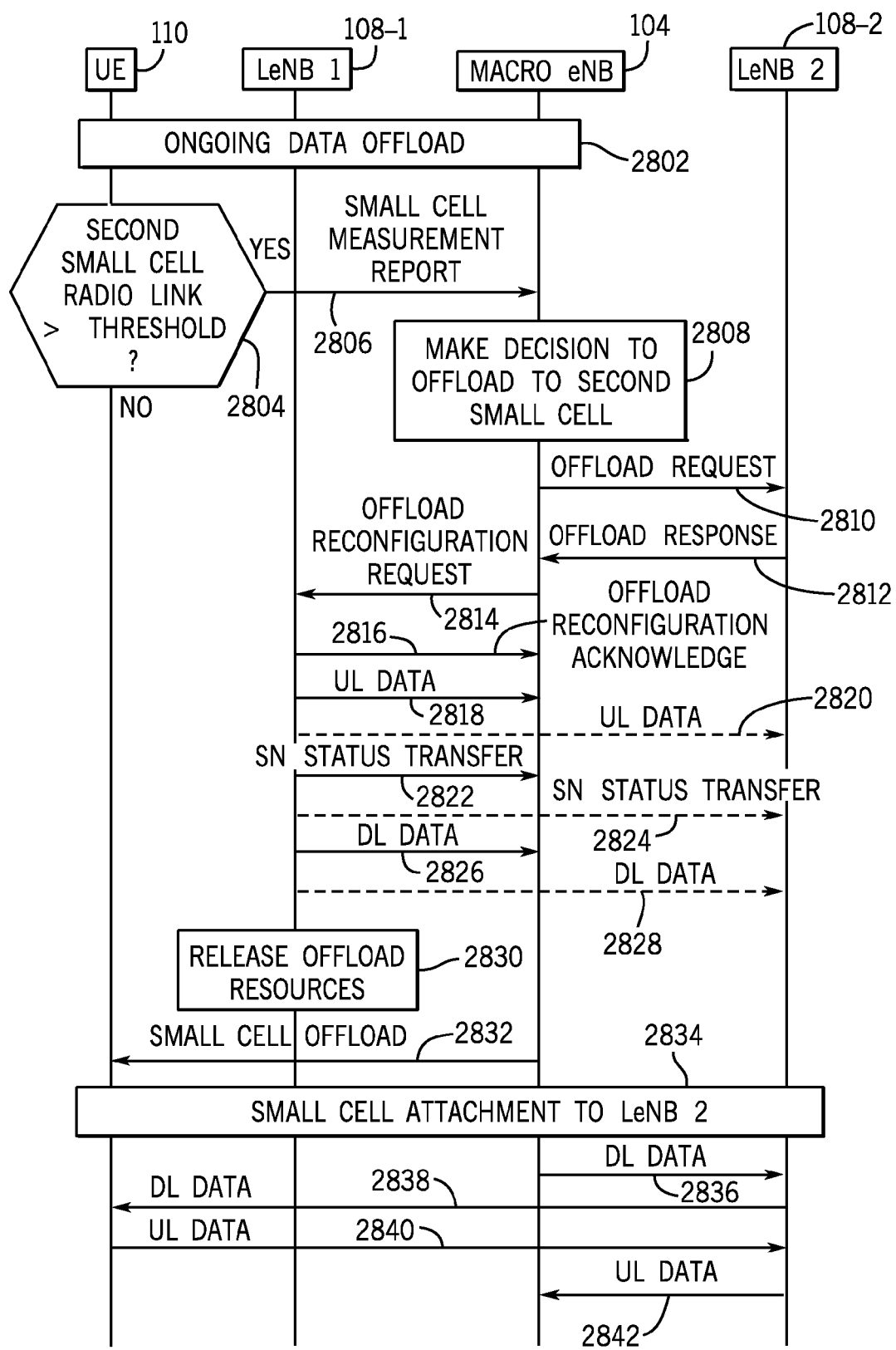
FIGS. 28 and 29 are message flow diagrams of offload UE transfer procedures.

FIG. 28 is a message flow diagram illustrating UE transfer of a UE 110 (more specifically, transfer of the data offload for the UE 110) from a first small cell to a second small cell. The nodes involved in such a procedure include the UE 110, a first LeNB 108-1 of the first small cell, a macro eNB 104, and a second LeNB 108-2 of the second small cell. As shown in FIG. 28, an ongoing data offload has been established (at 2802) between the macro eNB 104 and the first LeNB 108-1, such as by using the process depicted in FIG. 20.

At some later point in time, the UE 110 can detect (at 2804) that the radio link quality to the second small cell exceeds a specified threshold. Although not shown, the UE 110 may also detect that the radio link quality to the first small cell has deteriorated. In response to such a determination at 2804, the UE 110 sends (at 2806) a small cell measurement report to the macro eNB 104. The small cell measurement report identifies the second small cell and contains an indication that the radio link to the second small cell exceeds the specified threshold (and possibly an indication of the quality of the radio link to the first small cell).

The macro eNB 104 can make a decision (at 2808) to perform data offload to the second small cell (effectively transferring the data offload from the first small cell to the second small cell). The macro eNB 104 sends (at 2810) an Offload Request message to the second LeNB 108-2, which responds (at 2812) with an Offload Request Acknowledge message (to accept the request) or Offload Request Failure message (to deny the request).

Assuming that the LeNB 108-2 has accepted the Offload Request, the macro eNB 104 can send (at 2814) an Offload Reconfiguration Request message to the first LeNB 108-1. The Offload Reconfiguration Request message can identify the radio access bearer(s) that is (are) to be removed from the first LeNB 108-1. The first LeNB 108-1 responds (at 2816) with an Offload Reconfiguration Acknowledge message. The first LeNB 108-1 also sends uplink data associated with the removed radio access bearer(s) either to the macro eNB 104 (at 2818) or to the second LeNB 108-2 (at 2820).

In implementations where the PDCP layer is also included in the LeNBs (such as according to the arrangement of FIG. 7), the first LeNB 108-1 can also send a PDCP SN Status Transfer message to the macro eNB 104 (at 2822) or to the second LeNB 108-2 (at 2824).

Similarly, the first LeNB 108-1 can also send any downlink data for the removed radio access bearer(s) to the macro eNB 104 (at 2826) or to the second LeNB 108-2 (at 2828).

Once all uplink data and downlink data for the removed radio access bearer(s) have been transferred from the first LeNB 108-1 to the second LeNB 108-2 (either directly between the first LeNB 108-1 and second LeNB 108-2 or indirectly through the macro eNB 104), the first LeNB 108-1 can release (at 2830) offload resources.

In response to receipt of the Offload Reconfiguration Acknowledge message from the second LeNB 108-2, the macro eNB 104 sends (at 2832) a Small Cell Offload message to the UE 110, where this Small Cell Offload message contains information for the second LeNB 108-2. In response, using the information (e.g. random access information and system information) in the Small Cell Offload message, the UE 110 performs (at 2834) an attachment procedure with the second LeNB 108-2.

Downlink data for the UE 110 can subsequently be sent (at 2836) from the macro eNB 104 to the second LeNB 108-2. The second LeNB 108-2 then forwards (at 2838) the downlink data to the UE 110. In the uplink direction, the UE 110 can send (at 2840) uplink data to the second LeNB 108-2. The second LeNB 108-2 then forwards (at 2842) the uplink data to the macro eNB 104.

In alternative implementations, if macro eNB 104 is a relay point for data, say at the PDCP layer, the macro eNB 104 can store local copies of PDCP PDUs. An LeNB will notify the macro eNB 104 about the delivery status of each PDCP PDU. Unless a PDCP PDU is delivered successfully, the macro eNB 104 may not remove its local copy of the PDCP PDU. The delivery status of each PDCP PDU is thus fully available in the macro eNB 104. In this case, when the UE transfer from the first small cell to the second small cell occurs, the macro eNB 104 is able to fully control the data forwarding. The operation of the first and second small cells can be simplified since no data is to be forwarded from the first small cell to the second small cell or macro cell. The macro cell will forward any undelivered PDCP PDU to the second small cell.

In some implementations, the availability of a direct forwarding path from the first small cell to the second small cell is determined in the first LeNB 108-1, and can be indicated to the macro eNB 102. If X2 connectivity is available between the LeNBs 108-1 and 108-2, then a direct forwarding path may be available. The direct forwarding path may also be available during the configuration stage of a small cell or during the UE transfer initialization stage. If a direct forwarding path is not available, indirect forwarding may be used. The macro eNB 104 uses the indication (of whether a direct forwarding path is available) from the first LeNB 108-1 to determine whether to apply indirect forwarding, and if another macro eNB should be contacted for the indirect forwarding.

As an example, the first LeNB 108-1 may provide a list of target LeNBs that the first LeNB 108-1 has an X2 connection with. This list may be carried in a new information and included in one of the messages sent from the first LeNB 108-1 to the macro eNB 104. As an example, an information element called "Direct Forwarding Path Availability" can be defined. This information element is optional over the X3 interface, where its absence can be interpreted as "direct path not available."

Figure 29:
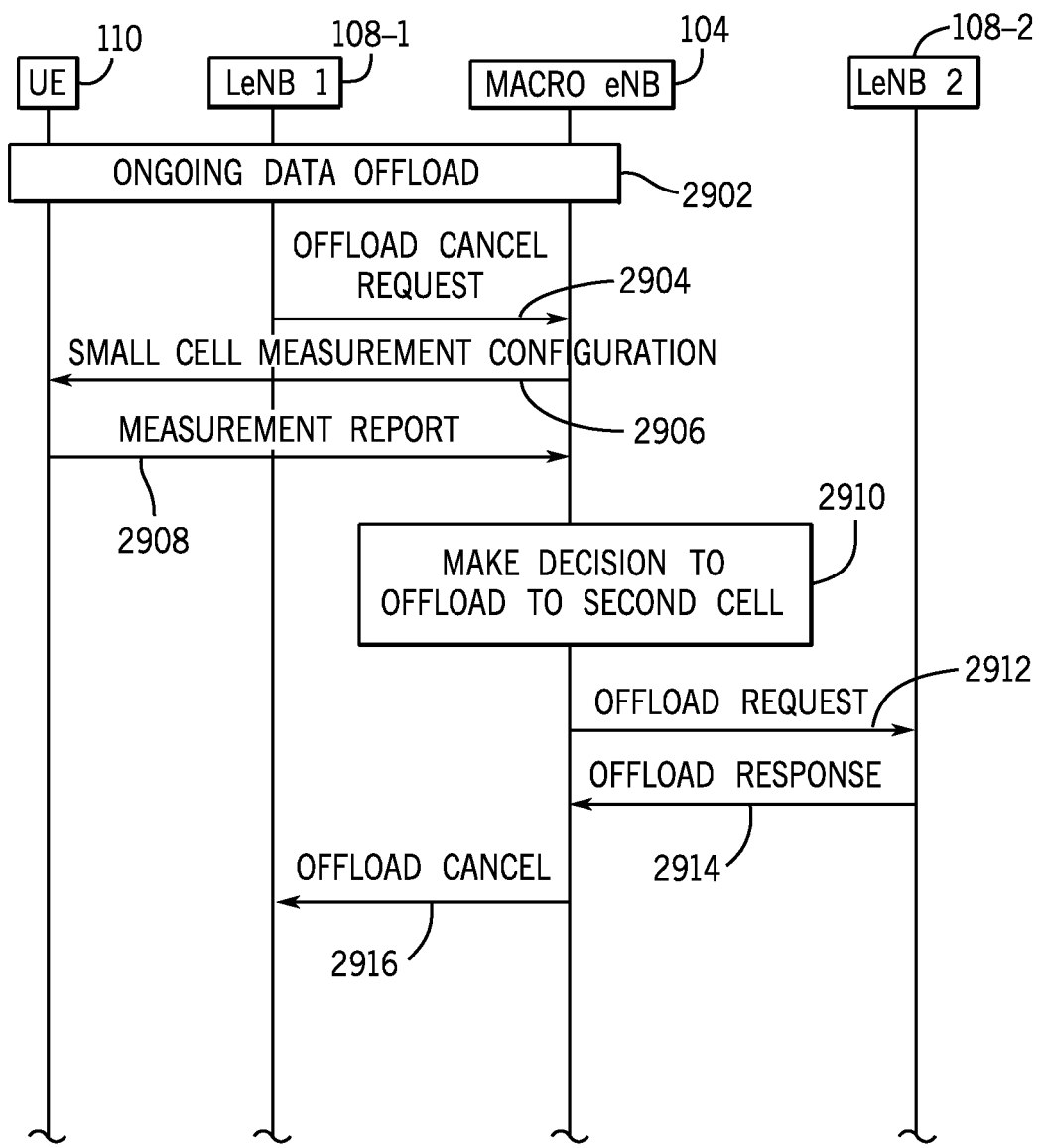

FIG. 28 depicts an example process in which UE transfer from the first small cell to the second small cell is initiated by the macro eNB 104. In other examples, a UE transfer may be initiated by the first LeNB 108-1, which can cause the macro eNB 104 to decide to transfer the UE 110 to the second LeNB 108-2 attached to the same macro eNB 104. A process for performing such UE transfer is depicted in FIG. 29.

An ongoing data offload has been established (at 2902) between the macro eNB 104 and the first LeNB 108-1, such as by using the process depicted in FIG. 20. To initiate a UE transfer for any reason, the first LeNB 108-1 sends (at 2904) an Offload Cancel Request message over the X3 interface to the macro eNB 104. In response, the macro eNB 104 can configure the UE 110 to initiate a measurement procedure if not configured earlier, or the macro eNB 104 can trigger the UE 110 to start the measurement procedure with new measurement configurations. To perform either of the foregoing, the macro eNB 104 sends (at 2906) a small cell measurement configuration message to the UE 110. The UE 110 may send (at 2908) a measurement report, and based on the measurement data in the measurement report, the macro eNB 104 can make a decision (at 2910) to offload to the second LeNB from a set of target LeNBs. The macro eNB 104 can also simply choose the second LeNB from prior measurement reports if they are not out-of-date.

The macro eNB 104 next sends (at 2912) an Offload Request message to the second LeNB 108-2 with information identifying radio access bearer(s) to be offloaded to the second small cell. If the second LeNB 108-2 accepts the Offload Request, the second LeNB 108-2 responds (at 2914) with an Offload Request Acknowledge message to the macro eNB 104.

The macro eNB 104 then sends (at 2916) an Offload Cancel message to the first LeNB 108-1. The remaining process is similar to tasks 2830-2842 depicted in FIG. 28.

In another example, in a UE transfer initiated by the macro eNB 104, the macro eNB 104 can decide to move all of the UE's radio access bearers or a subset of the UE's radio access bearers back to the macro eNB 104 itself. The corresponding process is outlined as follows.

The macro eNB 104 sends an Offload Reconfiguration Request message to the first LeNB 108-1. Within the Offload Reconfiguration Request message, the macro eNB 104 provides a list of radio access bearers that are to be removed. If the list contains all the radio access bearers of the UE that are handled by the first LeNB 108-1, then the first LeNB 108-1 can consider the UE as being completely transferred over to the macro eNB 104. The first LeNB 108-1 responds with an Offload Reconfiguration Acknowledge message back to the macro eNB 104.

Alternatively, the macro eNB 104 can send an Offload Cancel message to the first LeNB 108-1, instead of the Offload Reconfiguration Request message.

System Architecture

Figure 30:
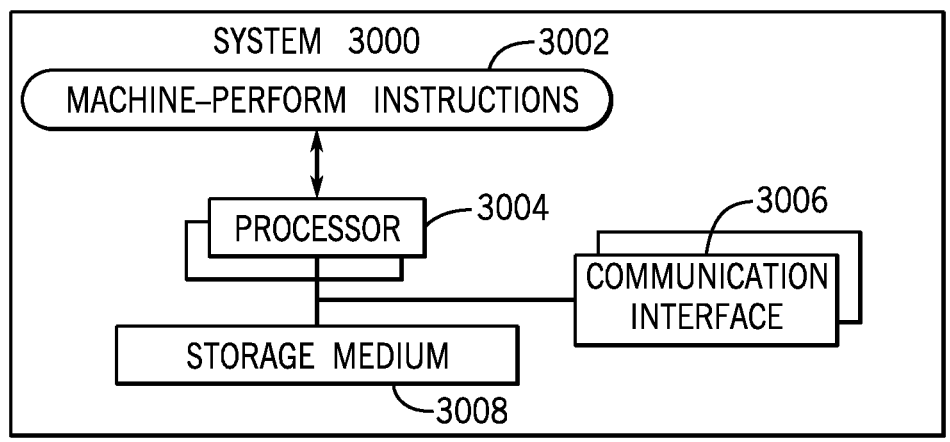
FIG. 30 is a block diagram of an example system that is capable of incorporating some implementations.

FIG. 30 is a block diagram of an example system 3000 that can be any of various nodes described above, include a UE, LeNB, macro eNB, and LeNB GW. The system 2000 includes machine-readable instructions 3002 that can perform tasks of any of the foregoing entities as discussed above. The machine-readable instructions 3002 are executable on one or multiple processors 3004. A processor can include a microprocessor, microcontroller, processor module or subsystem, programmable integrated circuit, programmable gate array, or another control or computing device.

The processor(s) 3004 can be coupled to one or multiple communication interfaces 3006, which enable communication between the system 3000 and one or more other nodes. Each communication interface 3006 includes network interface hardware in addition to firmware or software for implementing higher layers (including those protocol layers discussed above). The system 3000 also includes a storage medium (or storage media) 3008 to store data and instructions.

The storage medium (or storage media) 2008 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a local wireless access network node, a request to offload at least a portion of data traffic for a user equipment from a macro wireless access network node to the local wireless access network node, wherein the user equipment is to maintain a first wireless connection to the macro wireless access network node after the offload;
sending, by the local wireless access network node, a response to indicate that the local wireless access node has accepted the request;
performing, by the local wireless access network node with the user equipment, a procedure to establish a second wireless connection between the local wireless access network node and the user equipment, the second wireless connection to communicate the at least a portion of data traffic for the offload, and the procedure establishing the second wireless connection using control information sent to the user equipment by the macro wireless access network node over the first wireless connection between the macro wireless access network node and the user equipment.

2. The method of claim 1, further comprising:
sending, by the local wireless access network node, a cancellation request to the macro wireless access network node to cancel an existing offload for the user equipment.

3. The method of claim 1, wherein the local wireless access network node is a first local wireless access node, the method further comprising:
receiving, by the first local wireless access network node, a message indicating that handling of the at least a portion of the data traffic is to be removed from the first local wireless access network node, to cause transfer of the at least a portion of the data traffic to another local wireless access network node.

4. The method of claim 3, wherein the message identifies radio access bearers that are to be removed from the first wireless access network node.

5. The method of claim 3, wherein receiving the message is part of a user equipment transfer from the first wireless access network node to the another wireless access network node.

6. The method of claim 1, wherein the request identifies at least one radio access bearer to offload from the macro wireless access network node to the local wireless access network node.

7. The method of claim 1, wherein the request identifies plural radio access bearers to offload from the macro wireless access network node to the local wireless access network node, and wherein the response indicates acceptance of just a subset of the plural radio access bearers.

8. The method of claim 1, wherein the response includes random access channel configuration information of the local wireless access network node and random access preamble information to be sent by the macro wireless access network node to the user equipment, the control information used to establish the second wireless connection including the random access preamble information.

9. The method of claim 8, further comprising:
receiving, by the local wireless access network node, a physical random access signal based on the random access information sent by the user equipment to establish the second wireless connection with the local wireless access network node.

10. The method of claim 8, further comprising:
receiving, by the local wireless access network node, downlink data from the macro wireless access network node; and
sending, by the local wireless access network node, the downlink data to the user equipment.

11. The method of claim 8, further comprising:
sending, by the local wireless access network node, uplink data received from the user equipment to the macro wireless access network node.

12. The method of claim 1, wherein the control information sent to the user equipment by the macro wireless access network node is based on control information included in the response sent from the local wireless access network node to the macro wireless access network node.

13. The method of claim 1, wherein the local wireless access network node provides a small cell within a coverage area of a macro cell provided by the macro wireless access network node, the macro wireless access network node to communicate control plane data to user equipment for a plurality of local wireless access network nodes that provide respective small cells within the coverage area of the macro cell.

14. The method of claim 1, wherein the local wireless access network node communicates user plane data with the user equipment over the second wireless connection but communicates no control plane data associated with the user plane data.

15. A macro wireless access network node, comprising:
a first communication interface to establish a wireless connection with a user equipment that is moveable between coverage areas of different wireless access network nodes;
a second communication interface to communicate with a local wireless access network node; and
at least one processor to:
send a request to offload at least a portion of data traffic for the user equipment from the macro wireless access network node to the local wireless access network node, wherein the user equipment is to maintain the wireless connection to the macro wireless access network node after the offload, and wherein the request identifies radio access bearers to offload from the macro wireless access network node to the local wireless access network node; and
receive, from the local wireless access network node, a response indicating acceptance of the request, the response identifying less than all of the radio access bearers identified in the request.

16. The macro wireless access network node of claim 15, wherein the at least one processor is to configure the user equipment to perform measurement of at least one carrier frequency used by local wireless access network nodes.

17. The macro wireless access network node of claim 15, wherein the at least one processor is to further:
in response to the response from the local wireless access network node indicating acceptance of the request, send, to the user equipment, a control message to cause the user equipment to establish a second wireless connection with the local wireless access network node in addition to the wireless connection between the user equipment and the macro wireless access network node.

18. The macro wireless access network node of claim 15, wherein the at least one processor is to further send, to the local wireless access network node, downlink data for the user equipment.

19. The macro wireless access network node of claim 15, wherein the at least one processor is to further send, to the local wireless access network node, a sequence number of a Packet Data Convergence Protocol (PDCP) packet data unit (PDU).

20. The macro wireless access network node of claim 15, wherein the at least one processor is to further receive, from the local wireless access network node, uplink data of the user equipment.

21. The macro wireless access network node of claim 15, wherein the at least one processor is configured to further direct the local wireless access network node to receive or transmit data for the user equipment from or to a core network node.

22. The macro wireless access network node of claim 15, wherein the at least one processor is to further:
send a respective request to offload a corresponding portion of data traffic to each of plural local wireless access network nodes;
receive a response accepting the respective request from each of the plural local wireless access network nodes;
select one of the plural local wireless access networks, and accept the response received from the selected local wireless access network node; and
send a cancel message to each of local wireless access network nodes of the plural local wireless access network nodes other than the selected local wireless access network node, the cancel message indicating to each of the local wireless access network nodes receiving the cancel message that the respective request is to be cancelled.

23. The macro wireless access network node of claim 15, wherein the at least one processor is to further:
send a reconfiguration message to the local wireless access network node to add or remove a portion of data traffic for the user equipment to be handled by the local wireless access network node.

24. The macro wireless access network node of claim 15, wherein the at least one processor is to further:
in response to the response from the local wireless access network node indicating acceptance of the request, send, to the user equipment, a control message to establish a second wireless connection with the local wireless access network node to communicate user plane data of the radio access bearers identified in the response indicating acceptance of the request.

25. The macro wireless access network node of claim 24, wherein receiving the response comprises receiving control information in the response, and wherein the control message sent to the user equipment includes the control information to be used by the user equipment in establishing the second wireless connection.

26. A user equipment comprising:
a first communication interface to establish a first wireless connection with a macro wireless access network node;
a second communication interface to communicate with a local wireless access network node; and
at least one processor to:
in response to detecting a radio link strength of the local wireless access network node exceeding a threshold after the user equipment has moved into a coverage area of the local wireless access network node, send, to the macro wireless access network node, measurement data of a radio link of the local wireless access network node;
receive, over the first wireless connection from the macro wireless access network node, an offload control message relating to performing offload of at least one radio access bearer for the user equipment from the macro wireless access network node to the local wireless access network node; and
use information in the offload control message to establish a second wireless connection with the local wireless access network node, while maintaining the first wireless connection with the macro wireless access network node;
communicate data of the at least one radio access bearer over the second wireless connection; and
communicate data of at least another radio access bearer over the first wireless connection.

27. The user equipment of claim 26, wherein the user equipment is configured to maintain a Radio Resource Control (RRC) connection with just the macro wireless access network node while concurrently communicating data of corresponding radio access bearers over the first and second wireless connections.

28. A method for wireless communication between a network with a user equipment, the method comprising:
receiving a control plane data stream and a user plane data stream for the user equipment at a network component;
determining, by an inter-cell scheduler based on a measurement report from the user equipment, that a subset of the data plane data stream is to be sent to the user equipment via a local wireless access network node, wherein the local wireless access network node is connected to the network component via a backhaul link;
sending, by the network component, the subset of the data plane data stream to the local wireless access network node;
sending, by the local wireless access network node, the subset of the data plane data stream over a first wireless connection to the user equipment, wherein the first wireless connection is established between the local wireless access network node and the user equipment; and
communicating, by the network component, the control plane data stream over a second wireless connection to the user equipment, wherein the second wireless connection exists simultaneously with the first wireless connection.

29. The method of claim 28, wherein the network component includes a macro wireless access network node, and the control plane data stream is communicated by the macro wireless access network node to the user equipment, and wherein the macro wireless access network node provides a macro cell, and a small cell provided by the local wireless access network node is within a coverage area of the macro cell.

* * * * *